(12) United States Patent
Andreev et al.

(10) Patent No.: US 8,677,306 B1
(45) Date of Patent: Mar. 18, 2014

(54) MICROCONTROLLER CONTROLLED OR DIRECT MODE CONTROLLED NETWORK-FABRIC ON A STRUCTURED ASIC

(71) Applicant: eASIC Corporation, Santa Clara, CA (US)

(72) Inventors: Alexander Andreev, San Jose, CA (US); Andrey Nikitin, Moscow (RU); Marian Serbian, Santa Clara, CA (US); Massimo Verita, Pleasanton, CA (US)

(73) Assignee: EASIC Corporation, Santa Clara, CA (US)

( * ) Notice: Subject to any disclaimer, the term of this patent is extended or adjusted under 35 U.S.C. 154(b) by 0 days.

(21) Appl. No.: 13/649,551

(22) Filed: Oct. 11, 2012

(51) Int. Cl.
*G06F 11/22* (2006.01)
*G06F 17/50* (2006.01)

(52) U.S. Cl.
USPC ........... 716/136; 716/102; 716/106; 716/137; 714/39; 714/30; 714/729; 714/730; 714/733

(58) Field of Classification Search
USPC .......... 716/102, 106, 136, 137; 714/725, 726, 714/727, 733
See application file for complete search history.

(56) References Cited

U.S. PATENT DOCUMENTS

| | | | | |
|---|---|---|---|---|
| 6,665,817 | B1 * | 12/2003 | Rieken | 714/30 |
| 7,251,763 | B2 * | 7/2007 | Halliday et al. | 714/727 |
| 7,269,805 | B1 * | 9/2007 | Ansari et al. | 716/136 |
| 8,423,847 | B2 * | 4/2013 | Grise et al. | 714/733 |
| 2007/0011642 | A1 * | 1/2007 | Pribbernow | 716/18 |
| 2007/0168749 | A1 * | 7/2007 | Stewart et al. | 714/39 |
| 2009/0055696 | A1 * | 2/2009 | Grise et al. | 714/725 |
| 2010/0238707 | A1 * | 9/2010 | Tsuchida | 365/148 |
| 2011/0211080 | A1 * | 9/2011 | Silverbrook | 348/207.2 |
| 2012/0012895 | A1 * | 1/2012 | Or-Bach et al. | 257/204 |
| 2012/0030532 | A1 * | 2/2012 | Jain et al. | 714/726 |
| 2012/0068229 | A1 * | 3/2012 | Bemanian et al. | 257/209 |
| 2012/0221910 | A1 * | 8/2012 | Grise et al. | 714/733 |

* cited by examiner

*Primary Examiner* — Jack Chiang
*Assistant Examiner* — Brian Ngo

(57) ABSTRACT

A network-fabric used for testing with an external or internal tester is shown for a Structured ASIC. In one embodiment, the Structured ASIC uses a microprocessor, network-aware IO routing fabric comprising network agents in a scalable novel configuration, with the network-aware IO having a plurality of blocks connected in series in a plurality of paths in the fabric leading to and from the microprocessor and memory and/or logic, the blocks acting as intelligent network agents under processor control to determine what state they can assume, whether to pass a data signal or not along these paths, comprising open loops and closed loops running to and from the microprocessor and memory and/or logic, primarily for testing and determining the state of the memory and logic. In another embodiment a JTAG controller may receive JTAG test commands from an external testing apparatus and set up to communicate along the fabric.

19 Claims, 10 Drawing Sheets

MICROCONTROLLER CONTROLLED OR DIRECT MODE CONTROLLED NETWORK-FABRIC ON A STRUCTURED ASIC

CROSS-REFERENCE TO RELATED APPLICATIONS

The present application is related to: U.S. application Ser. No. 13/649,510, for "VIA-CONFIGURABLE HIGH-PERFORMANCE LOGIC BLOCK INVOLVING TRANSISTOR CHAINS" by Alexander Andreev, Sergey Gribok, Ranko Scepanovic, Phey-Chuin TAN, Chee-Wei KUNG, filed the same day as the present invention, Oct. 11, 2012; U.S. application Ser. No. 13/49 529, for "ARCHITECTURAL FLOORPLAN FOR A STRUCTURED ASIC MANUFACTURED ON A 28 NM CMOS PROCESS LITHOGRAPHIC NODE OR SMALLER" by Alexander Andreev, Ranko Scepanovic, Ivan Pavisic, Alexander Yahontov, Mikhail Udovikhin, Igor Vikhliantsev, Chong-Teik LIM, Seow-Sung LEE, Chee-Wei KUNG, filed the same day as the present invention, Oct. 11, 2012; U.S. application Ser. No. 13/649,547, for "CLOCK NETWORK FISHBONE ARCHITECTURE FOR A STRUCTURED ASIC MANUFACTURED ON A 28 NM CMOS PROCESS LITHOGRAPHIC NODE" by Alexander Andreev, Andrey Nikishin, Sergey Gribok, Phey-Chuin TAN, Choon-Hun CHOO, filed the same day as the present invention, Oct. 11, 2012; U.S. application Ser. No. 13/649,563, for "TEMPERATURE CONTROLLED STRUCTURED ASIC MANUFACTURED ON A 28 NM CMOS PROCESS LITHOGRAPHIC NODE" by Alexander Andreev and Massimo Verita, filed the same day as the present invention, Oct. 11, 2012; U.S. application Ser. No. 13/649,584, for "DIGITALLY CONTROLLED DELAY LINE FOR A STRUCTURED ASIC HAVING A VIA CONFIGURABLE FABRIC FOR HIGH-SPEED INTERFACE" by Alexander Andreev, Sergey Gribok, Marian Serbian, Massimo Verita, Kee-Wei SIM, Kok-Hin LEW, filed the same day as the present invention, Oct. 11, 2012; and all assigned to the same Assignee as the present invention, all of which are specifically incorporated herein by reference.

BACKGROUND OF THE INVENTION

1. Field of Invention

The present invention relates generally to the field of Structured ASICs. Embodiments of the present invention relate to a microcontroller for a Structured ASIC that is primarily used for testing the memory and logic of the Structured ASIC.

2. Description of Related Art

The present invention relates generally to an improved Structured ASIC (Structured Application Specific Integrated Circuit). Broadly defined, structured application-specific integrated circuits (ASICs) may attempt to reduce the effort, expense and risk of producing ASICs by standardizing portions of the physical implementation across multiple products. By amortizing the expensive mask layers of the device across a large set of different designs, the non-recurring engineering (NRE) for a customized ASIC seen by a particular customer, which are one-time costs that do not depend on the number of units sold, can be significantly reduced. There may be additional benefits to the standardization of some portion of mask set, which may include improved yield through higher regularity and/or reduced manufacturing time from tape-out to packaged chip.

ASICs can be broken down further into a full-custom ASIC, a Standard Cell-based ASIC (standard-cell), a Structured ASIC, and a gate array ASIC. At the opposite end of an ASIC is a field-programmable gate array (FPGA), an integrated circuit designed to be configured by the customer or designer after manufacturing in the field using software commands rather than at a foundry or IC fab. Other non-ASICs include simple and complex PLDs (Programmable Logic Devices), and off-the-shelf small and medium scale IC components (SSI/MSI). Further classifications include a Configurable Logic Block (CLB). A configurable logic block (CLB) may be an element of field-programmable gate array (FPGA), structured application-specific integrated circuit (ASIC) devices, and/or other devices. CLBs may be configured, for example, to implement different logic cells (combinational, such as NANDs, NORs, or inverters, and/or sequential, such as flip-flops or latches).

A full-custom ASIC customizes every layer in an ASIC device, which can have 10 to 15 layers, requiring in a lithography process 10 to 15 masks. Since the customized design of the ASIC occurs at the transistor level, and modern ASICs have tens if not hundreds of millions of transistors, a full-custom ASIC is typically economically feasible only for applications that required millions of units. An example of such an application is the cell phone digital modem or a flat panel television video processing device.

In a standard cell ASIC, circuits are constructed from predefined logic components known as cells. Designers work at the gate level not the finer transistor level, simplifying the process. The fab manufacturing the device provides a library of basic building blocks that can be used in the cells, such as basic logic gates, combinational components (and-or-inverter, multiplexer, 1-bit full adder), and basic memory, such as D-type latch and flip-flop. A library of other function blocks such as adder, barrel shifter and random access memory (RAM) may also exist. While the layout of each cell in a standard cell is predetermined, the circuit itself has to be uniquely constructed by connecting all layers to one another and the cells within each layer in a custom manner, which takes time and effort.

A register is a standard component in an ASIC, and is a group of flip-flops that stores a bit pattern. Registers can hold information from components or hold state between iterations of a clock so that it can be accessed by other components, to allow I/O synchronization, handshaking data between clock domains, pipelining, and the like.

In a gate-array ASIC, the level of abstraction is one level higher than a standard cell, in that each building block in a gate array is from an array of predefined cells, known as a base cell, which resembles a logic gate. Since location and type of cell is predetermined, gate-array ASICs can be manufactured in advance in greater quantities and inventoried for use later. A circuit is manufactured by customizing the interconnect between these cells, which is done at the metal interconnect masks. As in gate level ASICs, typically 3 to 5 metal layers have to be customized to specify the interconnect required to complete the circuit, which simplifies the manufacturing process.

In a Structured ASIC the level of abstraction is somewhere between the full-custom ASIC and the FPGA. In a Structured ASIC there may be a dozen or more metal layers, but in many structured ASICs not all metal layers need be for routing, and some layers may be pre-routed, and only the top layers are used for routing. The idea behind the structured ASIC is that the most of the layers are predefined; only a few metal or via layers are available for customization. An extreme case is the eASIC structured ASIC, assignee to this invention: only a single via layer is available for customization, and all the other layers are predefined. This reduces the complexity of the manufacturing process, since non-recurring engineering costs are much lower, as photolithographic masks are required only for the fewer metal layers not for every layer, and production cycles are much shorter, as metallization is a comparatively quick process. The metal layers may be interconnected with one another at select vertical holes called vias that are filled with conductive material, which can be called the 'via' metal layer, and thus be configurable at this layer, or 'via configurable'. If the logic fabric comprising the Structured ASIC is configured with traditional IC optical lithography involving photolithographic masks, it can be thought of as "mask programmable". In some designs, such as by the present assignee to this invention, eASIC Corporation, the customizable metallization layers may be reduced to a few or even a single via layer where the customization is performed, see by way of example and not limitation U.S. Pat. No. 6,953,956, issued to eASIC Corporation on Oct. 11, 2005; U.S. Pat. No. 6,476,493, issued to eASIC Corporation on Oct. 11, 2005, and Nov. 5, 2002; and U.S. Pat. No. 6,331,733, issued to eASIC Corporation on Dec. 18, 2001; all incorporated herein by reference in their entirety.

A complex field programmable device is a versatile non-ASIC, as the generic logic cells can sometimes be more sophisticated than ASIC cells, and the interconnect structure, can be programmable in the field using software rather than at a fab using for example photolithographic masks. A complex field programmable device can be re-programmed to a different circuit in hours, rather than only being programmable once at a fab like an ASIC. A complex field programmable device can be broadly divided into two categories, a Complex Programmable Logic Device (CPLD) and a Field Programmable Gate Array (FPGA). The logic cell of a CPLD can be more complex than an FPGA, and has a D-type flip-flop and a programmable logic device semiconductor such as a PAL™ type programmable logic device semiconductor, with configurable product terms. The interconnect of a CPLD is more centralized, with fewer concentrated routing lines. A FPGA logic cell is smaller, with a D-type flip-flop and a small Look Up Table (LUT), a multi input and single output block that is widely used for logic mapping, or multiplexers for routing signals through the interconnect and logic cells. The FPGA design that defines a circuit is stored in RAM, so when the FPGA is powered off, the design for the circuit disappears. When the FPGA is powered back up, one must reload the circuit design from non-volatile memory.

A simple PLD, historically called a programmable logic device, is much more limited in application, as they do not have a general interconnect structure. Today these devices are relatively rare by themselves and are now used as internal components in an ASIC or CPLD. Likewise, off-the-shelf small and medium scale IC components (SSI/MSI) are rarely used anymore, as they are first generation devices such as the 7400 series transistor-transistor logic (TTL) manufactured by various companies used in the 1960s and 70s to build computers. These components are no longer supported by modern EDA (Electronic Design Automation) software and have very limited functionality.

A complex field programmable device can be thought of as a form of programmable logic fabric. One such programmable logic fabric is a SRAM programmable Look-Up Table (LUT) technology that forms the basis of Field Programmable Gate Arrays and Complex Programmable Logic Devices. The programmable fabric technology allows synthesis of a logic design described in a Hardware Description Language (HDL) to be synthesized on to the logic fabric in order to perform the required logic function. The logic fabric includes memory blocks, embedded multipliers, registers and Look-Up Table logic blocks. Interconnect between logic elements is also SRAM programmable. As the state of the SRAM is deleted when powered off, the function of the programmable logic fabric incorporating SRAM can be changed.

ASIC design flow as a whole is a complex endeavor that involves many tasks, as described further herein, such as: logic synthesis, Design-for-Test (DFT) insertion, Electric Rules Check (ERC) on gate-level netlist, floorplan, die size, I/O structure, design partition, macro placement, power distribution structure, clocks distribution structure, preliminary check, (e.g., IR drop voltage drop, Electrostatic Discharge (ESD)), placement and routing, parasitic extraction and reduction (parasitic devices), Standard Delay Format (SDF) timing data generated by EDA tools, various checks including but not limited to: static timing analysis, cross-talk analysis, IR drop analysis, and electron migration analysis.

At the first step in the ASIC design flow, the design entry step, the circuit is described, as in a design specification of what the circuit is to accomplish, including functionality goals, performance constraints such as power and speed, technology constraints like physical dimensions, and fabrication technology and design techniques specific to a given IC foundry. Further in the design entry step is a behavioral description that describes at a high-level the intended functional behavior of the circuit (such as to add two numbers for an adder), without reference to hardware. Next is a RTL (Register Transfer Language) structural description which references hardware, albeit at a high-level of abstraction using registers. RTL focuses on the flow of signals between registers, with all registers updated in a synchronous circuit at the same time in a given clock cycle, which further necessitates in the design flow that the clocks be synchronized and the circuits achieve timing constraints and timing closure. RTL description captures the change in design at each clock cycle. All the registers are updated at the same time in a clock cycle for a synchronous circuit. A synchronous circuit consists of two kinds of elements: registers and combinational logic. Registers have a clock, input data, output data and an enable signal port. Every clock cycle the input data is stored internally and the output data is updated to match the internal data. Registers, often implemented as flip-flops, synchronize the circuit's operation to the edges of the circuit clock signal, and have memory. Combinational logic performs all the logical functions in the circuit and it typically consists of logic gates. RTL is expressed usually in a Verilog or VHDL Hardware Description Language (HDL), which are industry standard language descriptions. A hardware description language (HDL) is a language used to describe a digital system, for example, a network switch, a memory or a flip-flop. By using a HDL one can describe any digital hardware.

A design flow progresses from logical design steps to more physical design steps. Throughout this flow timing is of critical importance and must be constantly reassessed so that timing closure is realized throughout the circuit, since timing between circuits could change at different stages of the flow. Furthermore, the circuit must be designed to be tested for faults. The insertion of test circuitry can be done at the logic synthesis step, where register transfer level (RTL), is turned into a design implementation in terms of logic gates such as a NAND gate. Thus logic synthesis is the process of generating a structural view from the RTL design output using an optimal number of primitive gate level components (NOT, NAND, NOR, and the like) that are not tied to a particular device technology (such as 32 nm features), nor do with any information on the components' propagation delay or size.

Design for testing (DFT) in the context of an integrated circuit (IC) and ASIC is a design technique that makes it easier to test microelectronic hardware though the introduction of features that make testing the hardware for defects easier. DFT includes scan-design (scan-chain design) and various forms of Built-In-Self-Test (BIST). DFT can interface with Automatic Test Equipment (ATE), which is an apparatus that performs tests on a device, known as the Device Under Test (DUT), and DFT conforms to various standards set by standards bodies, such as Joint Test Action Group (JTAG) and the IEEE 1149.1 Standard Test Access Port and Boundary-Scan Architecture. Joint Test Action Group (JTAG) is the common name for what was later standardized as the IEEE 1149.1 Standard Test Access Port and Boundary-Scan Architecture. JTAG can be used for IC debug ports. In the embedded processor market, testing through debuggers occurs with JTAG to perform operations like single stepping and breakpointing. JTAG may also be used in a Boundary Scan chain, where the interface to on-chip registers is used to test combinational logic.

In scan-design, registers in a circuit design under test are connected to scan chain circuitry, and a test pattern is applied by shifting it into the scan chains, to access to internal modes of the circuit. A clock signal is pulsed to test the circuit during a capture cycle and the results shifted out of the circuit for analysis. Scan chains can also be used for debugging, when an integrated circuit can be made to go into test mode and the internal state of the circuit can be output or set to a particular state through the use of scan chains. This is sometimes known as "Design for Debug".

BIST can reduce the complexity associated with DFT in an IC by reducing the need for slower, more expensive external test equipment. One idea behind BIST is that the introduction of an input sequence to the flip-flops, shift registers and/or latches of an ASIC will generate over time a unique signal that can be sampled and stored by the BIST circuitry to check for the presence of errors, with the output accessible through a JTAG/IEEE 1149.1 standard interface.

In logical synthesis the circuit can be manipulated with Boolean algebra. Logical synthesis may be divided into two-level synthesis and multilevel synthesis. Because of the large number of fan-ins for the gates (the number of inputs to a gate), two-level synthesis employs special ASIC structures known as Programmable-Logic Arrays (PLA) and modified Programmable Array Logic (PAL)-based CPLD devices. Multilevel synthesis is more efficient and flexible, as it eliminates the stringent requirements for the number of gates and fan-ins in a design, and is preferred. The multilevel synthesis implementation is realized by optimizing area and delay in a circuit. However, optimizing multilevel synthesis logic is more difficult than optimizing two-level synthesis logic, and often employs heuristic techniques.

Functional synthesis is performed at the design entry stage to check that a design implements the specified architecture. Once Functional Verification is completed, the RTL is converted into an optimized gate level netlist, using smaller building blocks, in a step called Logic Synthesis or RTL synthesis. In EDA this task is performed by third party tools. The synthesis tool takes an RTL hardware description and a standard cell library for a particular manufacturer as input and produces a gate-level netlist as output. The standard cell library is the basic building block repository for today's IC design. Constraints for timing, area, speed, testability, and power are considered. Synthesis tools attempt to meet constraints by calculating the engineering cost of various implementations. The tool then attempts to generate the best gate level implementation for a given set of constraints, target the particular manufacturing process under consideration. The resulting gate-level netlist is a completely structural description with only standard cells at the "leaves" of the design. At logical/RTL synthesis it is also verified whether the Gate Level Conversion has been correctly performed by performing simulation. The netlist is typically modified to ensure any large net in the netlist has cells of proper drive strength (fan out), which indicates how many devices a gate can drive. A driving gate can be any cell in the standard cell library. During compilation of the netlist the EDA tool many adjust the size of the gate driving each net in the netlist so that area and power is not wasted in the circuit by having too large of a drive strength. Buffer cells are inserted when a large net is broken into smaller sections by the EDA tool.

Throughout the logical design state, an EDA tool performs a computer simulation of the layout before actual physical design.

The next step in the ASIC flow is the physical Implementation of the gate level netlist, or physical design, such as system partitioning, floorplanning, placement and routing. The gate level netlist is converted into a geometric representation of the layout of the design. The layout is designed according to the design rules specified in the library for the fab that is to build the digital device. The design rules are guidelines based on the limitations of the fabrication process.

The Physical Implementation step consists of several sub steps: system partitioning, floorplanning, placement and routing. These steps relating to how the digital device is to be represented by the functional blocks, as one ASIC or several (system partitioning), how the functional blocks are to be laid out on one ASIC (floorplanning) and how the logic cells can be placed within the functional blocks (placement) and how these logic cells are to be interconnected with wiring (routing). The file produced at the output of this Physical Implementation is the so-called GDSII file, which is the file used by the foundry to fabricate the ASIC.

Floorplanning involves inputting into a floorplanning tool a netlist that describes the interconnection of ASIC blocks (RAM, ROM, ALU, cache controller, and the like); the logic cells (NAND, NOR, D flip-flop, and so on) within the blocks; and the logic cell connectors (e.g., terminals, pins, or ports). Floorplanning maps the logical description as found in the netlist to the physical description, the floorplan.

The goals of floorplanning are to arrange the ASIC blocks on the silicon chip, to decide the location of the I/O pads, to decide the location and number of the power pads, the type of power distribution, and the location and type of clock distribution. Design constraints in floorplanning include minimizing the silicon chip area and minimizing timing delay. Delay is often estimated from the total length of the interconnect and from an estimate of the total capacitance. Interconnect length and predicted interconnect capacitance is estimated from statistics of previously routed chips, including such factors as net fanout and block size of the circuits in the ASIC.

For any design to work at a specific speed, timing analysis has to be performed throughout the ASIC design flow. One must check using a Static Timing Tool in EDA whether the design is meeting the speed requirements of the specification. Industry standard Static Timing tools include Primetime (Synopsys), which verifies the timing performance of a design by checking the design for all possible timing violations caused by the physical design process.

During placement, for example, timing is effected since the length of an interconnect caused by placement changes the capacitance of the interconnect and hence changes the delay in the interconnect. The goal of an EDA placement tool is to arrange all the logic cells within the flexible blocks on a chip to achieve objectives such as: guarantee the router can complete the routing step, minimize all the critical net delays, make the chip as dense as possible, minimize power dissipation, and minimize cross talk between signals. Modern EDA placement tools use even more specific and achievable criteria than the above. The most commonly used placement objectives are one or more of the following: minimize the total estimated interconnect length, meet the timing requirements for critical nets, and minimize the interconnect congestion.

Algorithms for placement do exist, for example, the minimum rectilinear Steiner tree (MRST) is the shortest interconnect using a rectangular grid. The determination of the MRST is in general an NP-complete problem—which is difficult to solve in a reasonable time. For small numbers of terminals heuristic algorithms exist, but they are expensive in engineering cost to compute. Several approximations to the MRST exist and are used by EDA tools.

In the routing step, the wiring between the elements is planned. A Structured ASIC cross-section has metal layers; in a standard cell ASIC there may be nine metal layers, but in many structured ASICs not all metal layers need be for routing, and some layers may be pre-routed, and only the top layers are used for routing. The metal layers may be interconnected with one another at select vertical holes called vias that are filled with conductive material and/or can be made to conduct, which may be called the 'via' connection layer or via metal layer, and thus be configurable at this layer, or 'via configurable'. If the logic fabric comprising the Structured ASIC is configured with traditional IC optical lithography involving photolithographic masks, it can be thought of as "mask programmable". The mask for a Structured ASIC is programmed at the vias, and when the Structured ASIC employs via-configurable logic blocks it can be termed a via-configurable logic block (VCLB) architecture. The configuration and programmability of the VCLB architecture of the Structured ASIC may be performed by changing properties of so called "configurable vias"—connections between VCLB internal nodes. A configurable or programmable via may be in one of two possible states: it may be either enabled or disabled. If a programmable via is enabled, then it can conduct a signal (i.e., the via exists and has low resistance). If a via is disabled, then it cannot practically conduct a signal, i.e., the via has very high resistance or does not physically exist. In some designs, such as by the present assignee to this invention, eASIC Corporation, the customizable metallization layers may be reduced to a few or even a single via layer where the customization is performed, see by way of example and not limitation U.S. Pat. No. 6,953,956 issued to eASIC Corporation on Oct. 11, 2005; U.S. Pat. No. 6,476,493, issued to eASIC Corporation on Oct. 11, 2005, and Nov. 5, 2002; and U.S. Pat. No. 6,331,733, issued to eASIC Corporation on Dec. 18, 2001; all incorporated herein by reference in their entirety. Further, a single via layer could be customized without resorting to mask-based optical lithography, but with a maskless e-beam process, as taught by the '956 patent.

During circuit extraction and post layout simulation, a back-annotated netlist is used with timing information to see if the physical design has achieved the objectives of speed, power and the like specified for the design. If not, the entire ASIC design flow process is repeated. In modern EDA tools the delays calculated from a simulation library of library cells used in the design, during physical design steps, are placed in a special file called the SDF (Synopsys Delay Format) file. Each cell can have its own delay based on where in the netlist it is found, what are its neighboring cells, the load on the cell, the fan-in, and the like. Each internal path in a cell can have a different propagation time for a signal, known as a timing arc. The maximum possible clock rate is determined by the slowest logic path in the circuit, called the critical path.

Compounding the problem of delay is that in a synchronous ASIC one must avoid clock skew, and different parts of the ASIC may have different clock domains controlling them, with the wiring nets that establish the clock signal forming a clock net branching out in the form of a clock tree. Establishing this tree, which often requires additional circuitry like buffer cells to help drive the massive clock tree, is called clock tree synthesis. As an ASIC is a synchronous circuit, all the clocks in the clock tree must be in synch and chip timing control achieved, typically by using Phase-Locked Loops (PLLs) and/or Delay-Locked Loops (DLLs). If the clock signal arrives at different components at different times, there is clock skew. Clock skew can be caused by many different things, such as wire-interconnect length, temperature variations and differences in input capacitance on the clock inputs of devices using the clock. Further, timing must satisfy register setup and hold time requirements. Both data propagation delay and clock skew play important parts in these calculations. Problems of clock skew can be solved by reducing short data paths, adding delay in a data path, clock reversing and the like. Thus during the physical synthesis steps, clock synthesis is an important step, which distributes the clock network throughout the ASIC and minimizes the clock skew and delay.

Finally, IP in the form of proprietary third party functionality such as a semiconductor processor may be embedded in an ASIC using soft macros, firm macros and hard macros that can be bought from third parties. A soft macro describes the IP as RTL code and does not have timing closure given the design specification nor layout optimization for the process under consideration. However as RTL code a soft macro can be modified by a designer with EDA tools and synthesized into the designer's library. By contrast, a hard macro is timing-guaranteed and layout-optimized for a particular design specification and process technology but is not portable outside the particular design and process under consideration, but is not represented in RTL code; rather a hard macro is tailored for a particular foundry and closer to GDSII layout. A firm macro falls between a hard macro and a soft macro. Firm macros are in netlist format, are optimized for performance/area/power using a specific fabrication technology, are more flexible and portable than hard macros, and more predictive of performance and area to be used than soft macros. Macros obviate a designer having to design every component from scratch, and are a great time saver. Third party designers favor firm and hard macros since it is easier to hide intellectual property (IP) present in such macros than it is to hide such IP in a soft macro.

Given the above, the pros and cons of standard cell ASICs versus a complex field programmable device such as an FPGA is as follows. The advantages of FPGAs are that they can be easy to design, have shorter development times and thus are faster in time-to-market, and have lower NRE costs. These are also the disadvantages of standard cell ASICs: they can be difficult to design, have longer development times, and higher NRE costs. The disadvantages of FPGAs are that design size is limited to relatively small production designs, design complexity is limited, performance is limited, power consumption is high, and there is a high cost per unit. These FPGA disadvantages are standard-cell advantages, as standard cells support large and complex designs, have high performance, low power consumption and low per-unit cost at a high volume.

A Structured ASIC falls between an FPGA and a Standard Cell-based ASIC in classification and performance. Structured ASIC's are used for mid-volume level designs. In a Structured ASIC the task for the designer is to map the circuit into a fixed arrangement of known cells.

Structured ASICs are closer to standard-cells in their advantages over FPGAs. The disadvantage of structured ASICs compared to FPGAs is that FPGAs do not require any user design information during manufacturing. Therefore, FPGA parts can be manufactured in larger volumes and can exist in larger inventories. This allows the latency of getting parts to customers in the right volumes to be reduced. FPGAs can also be modified after their initial configuration, which means that design bugs can be removed without requiring a fabrication cycle. Design improvements can be made in the field, and even done remotely, which removes the requirement of a technician to physically interact with the system. Given these pros and cons, structured ASICs combine the best features of FPGAs and standard cell ASICS.

Structured ASIC advantages over standard cell ASICs and FPGAs include that they are largely prefabricated, with components are that are almost connected in a variety of pre-defined configurations and ready to be customized into any one of these configurations. Fewer metal layers are needed for fabrication of a Structured ASIC, which dramatically reduces the turnaround time. Structured ASICs are easier and faster to design than standard cell ASICs. Multiple global and local clocks are prefabricated in a Structured ASIC. Consequently, there are no skew problems that need to be addressed by the ASIC designer. Thus signal integrity and timing issues are inherently addressed, making design of a circuit simpler and faster. Capacity, performance, and power consumption in a Structured ASIC is closer to that of a standard cell ASIC. Further, structured ASICs have faster design time, reduced NRE costs, and quicker turnaround than standard cell ASICs. Thus with structured ASICs the per-unit cost is reasonable for several hundreds to 100 k unit production runs.

A technology comparison between standard cell ASICs, structured ASICs, and FPGAs, respectively, is roughly as follows: generally speaking, and these ratios can change year-by-year and with different process lithographic nodes, there is a ratio of 100:33:1 between the number of gates in a given area for standard cell ASIC's, structured ASICs, and FPGAs, respectively; a ratio of 100:75:15 for performance (based on clock frequency); and a ratio of 1:3:12 for power.

Compared to a field-programmable gate array (FPGA), the unit price of a Structured ASIC solution may be reduced by an order of magnitude due to the removal of the storage and logic required for configuration storage and implementation. The unit cost of a Structured ASIC may be somewhat higher than a full custom ASIC, primarily due to the imperfect fit between design requirements and a standardized base layer, with certain I/O, memory and logic capacities. An ideal ASIC device may combine the field programmability of FPGAs with the power and size efficiency of ASICs or structured ASICs.

An Advanced Microcontroller Bus Architecture (AMBA) is a open standard, on-chip bus specification used in system-on-a-chip (SoC) designs including Structured ASICS. Advanced High-performance Bus (AHB) is a bus protocol introduced in Advanced Microcontroller Bus Architecture version 2 by ARM Ltd. company. AHB provides for single edge clock protocol, split transactions, several bus masters, burst transfers, pipelined operations, single-cycle bus master handover, non-tristate implementations, and large bus-widths (64/128 bit). A simple transaction on AHB can consists of an address phase and a subsequent data phase without wait states. Access to a target device may be controlled through a non-tristate MUX.

A System-in-Package (SiP) are multiple bare dice and/or chip-scale package (CSP) devices, each implementing their own function (e.g., analog, digital, and radio frequency (RF) dice) that are mounted on a SiP common substrate, which is used to connect them together. The substrate and its components are then placed in (or built into) a single package, called an IC (Integrated Circuit) or SiP, which is a traditional two-dimensional (2D) chip. A 2.5D IC/SiP is different from a traditional 2D IC/SiP, and in one type of 2.5D IC a silicon interposer is placed between the SiP common substrate and the dice, where this silicon interposer has through-silicon vias connecting the metallization layers on the upper and lower surfaces of the silicon interposer. The multiple bare dice can be attached to the silicon interposer using micro-bumps, which are about ~10 um in diameter, and in turn the silicon interposer is attached to the SiP substrate using regular flip-chip bumps, which can be ~100 um in diameter. Further, a 3D IC/SiP configuration enable designers to achieve higher levels of integration by allowing multiple die to be stacked vertically on top of one another. Wire bonds connect a topmost die with an underlying SiP substrate and allow the topmost die to communicate with a SiP substrate that is covered by an underlying die.

Testing is important in a Structured ASIC. What is needed in the art is a scalable microcontroller network for testing a Structured ASIC, in one of two modes: either through an external source for testing, or internally with a micro-controller or processor, preferably using JTAG signals, and an easy way of switching between the two modes.

SUMMARY OF THE INVENTION

Accordingly, an aspect of the present invention is to provide a microcontroller network for testing in a Structured ASIC, manufactured using a CMOS process with NFET/nMOS and PFET/pMOS transistors, which includes a via-configurable logic block (VCLB) architecture. VCLB configuration may be performed by changing properties of so called "configurable vias"—connections between VCLB internal nodes.

Another aspect of the present invention is to provide a core containing memory cells and a novel configuration logic cell array that is connected to Input/Output (IO) of three types, a first IO routing fabric running on the left and right sides (north/south or vertical) of the core and another high-speed IO routing fabric that may extending around the entire boundary of the core that communicates with a high-speed SerDes, and a "network-aware" IO that works with a microcontroller to test and repair memory and logic in the core.

Still another aspect of the present invention is to create a scalable network-aware IO.

Another aspect of the present invention is to provide a type of VCLB Structured ASIC that may use a microcontroller, network-aware IO, memory, and logic blocks in a novel manner, with the network-aware IO having a plurality of blocks connected in series in a path leading to and from the microcontroller, the blocks acting as intelligent network agents under processor control to determine what state they can assume, whether to pass a data signal or not along the path.

Another aspect of the present invention is to provide for a network-ware IO that can be operatively connected to an external testing device.

A further aspect of the present invention is for an easy way of switching testing modes when testing a chip from an external device test mode to an internal processor test mode, both modes of testing using the same network-aware IO and connection fabric. Hence an aspect of the invention is to provide two ways of testing a Structured ASIC, a Direct Mode control under the control of an external testing apparatus control agent and an internal microprocessor-based Microcontroller Control under the control of an internal testing control agent such as a microprocessor; generically defining the control agent that directs the testing for both cases as a Tester.

Another aspect of the present invention is to provide a type of VCLB Structured ASIC as described herein that is manufactured on a 28 nm CMOS process lithographic node or smaller.

Yet another aspect of the present invention is to provide via-configurable metal layers for the customization of the semiconductor device described herein to be customized in a single via layer.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

In an actual chip layout the exact placement of the blocks shown therein may vary from the simple stylized representations as shown in the drawings, and in addition there may be several layers in an ASIC chip that achieve the functionality shown in the figures, superimposed on one another, and not necessarily a single layer as shown in the drawings. This is true for most of the elements in the present invention, as understood by one of ordinary skill, and that does not detract from any of the teachings of the functional relationships between the elements of the present invention as shown herein.

Figure 1:
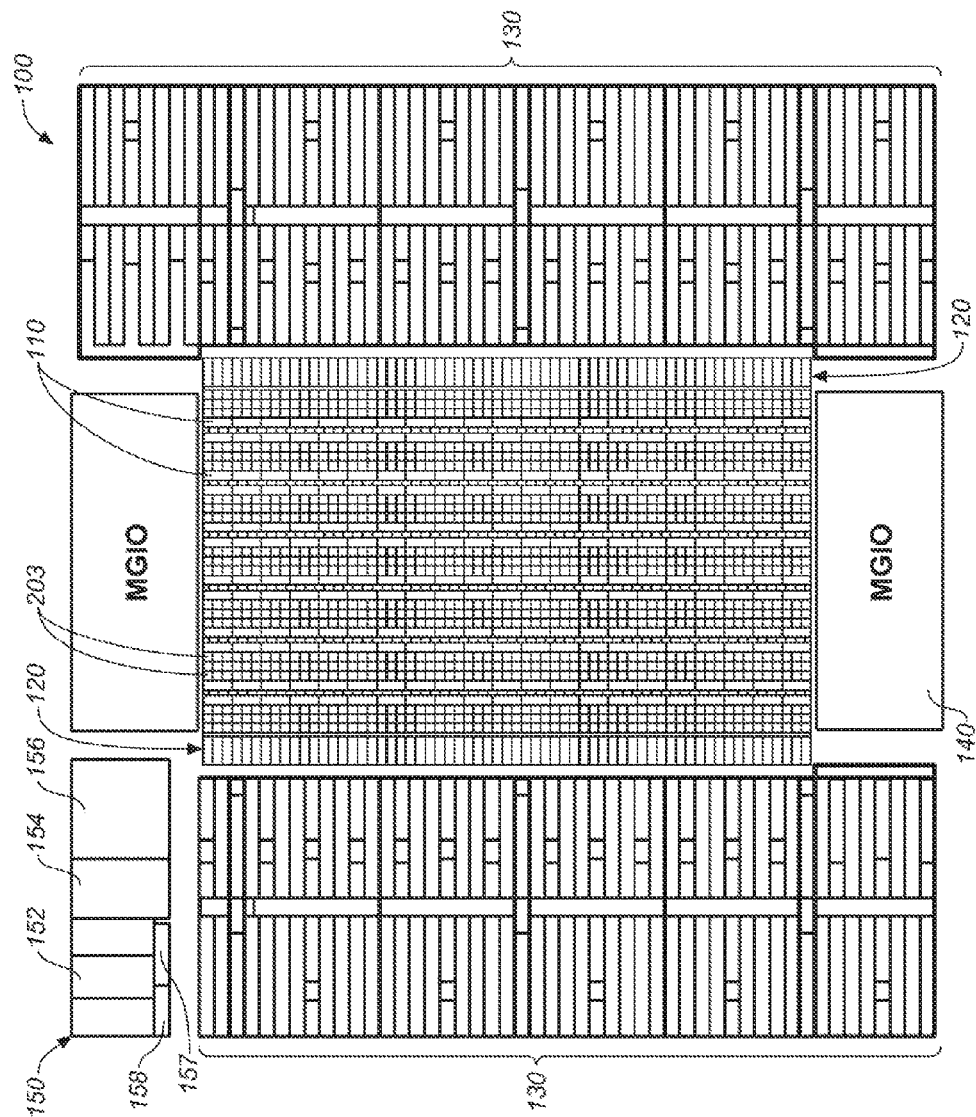
FIGS. 1 and 2 represent the generalized floor plan layout of Structured ASIC of the present invention in block diagram form.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The method and apparatus of the present invention may be described in software, such as the representation of the invention in an EDA tool, or realized in hardwire, such as the actual physical instantiation.

Regarding the floorplan of the present invention, the drawings sometimes show elements as blocks that in a physical implementation may differ from this stylized representation, but the essential features of the floorplan should be apparent to one of ordinary skill in the art from the teachings herein.

The elements in the floor plan of the present invention are operatively connected to one another where necessary, as can be appreciated by one of ordinary skill in the art from the teachings herein. As can be appreciated by one of ordinary skill, a conducting path is operatively connected to another conducting path even though there may be an intervening element between the two paths, such as a register or buffer.

Figure 2:
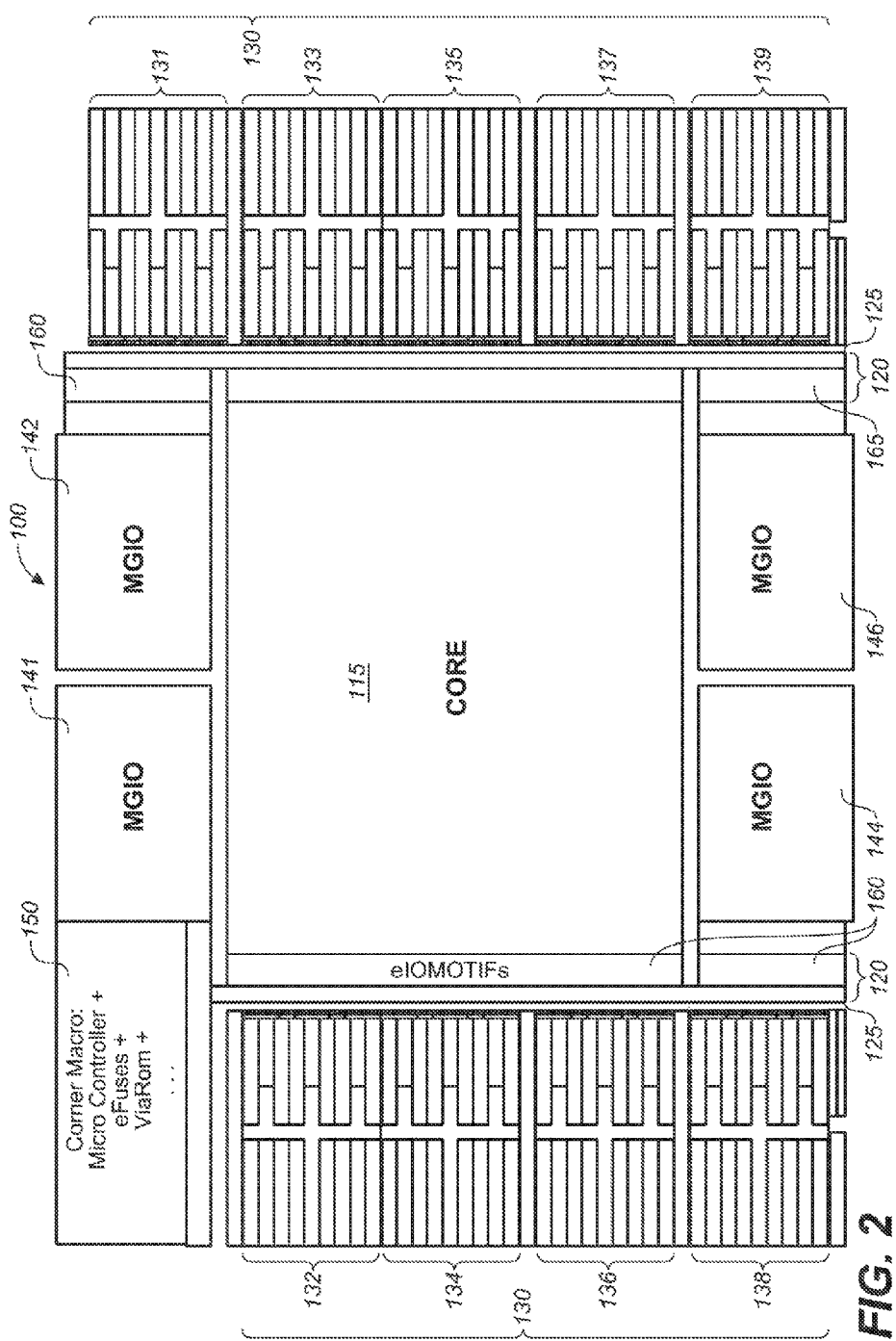

According to an embodiment of the invention, there is shown in FIGS. 1 and 2, a generalized floor plan architecture of the Structured ASIC chip 100, an ASIC having some pre-made elements that are mask-programmable and customized later by a customer, with the customization occurring by configuring one or more via layers between metal layers. The Structured ASIC 100 has logic cell module blocks 203, comprising via-programmable cells, and memory cells 110, the memory in blocks forming a north-south vertically extending column in the chip core 115 as shown. The memory is comprised of bRAM (Block RAM), formed in a column, which in the preferred embodiment is unbroken but can be bifurcated or in segments. The logic cell modules 203 and the memory blocks 110 together comprise the logic and memory core 115 of chip 100. The logic and memory alternate in a repeating pattern of columns in substantially rectilinear shaped core 115 as shown in FIG. 1, with the columns aligned along a vertical, north-south axis or direction to the core. There is an IO region 120 on the left and right sides of the chip 100, servicing the core 115 comprising the logic cells blocks 105 of logic cell modules 203 and the memory cells 110, as will be explained further herein, and extending vertically north-south along the core 115 as shown. Another IO area comprising an IO sub-bank 130 extends to the left and right of the chip 100 and operatively connected to the IO region 120 and the core 115. In a preferred embodiment the area taken up by the total IO area, the memory and the logic each comprise roughly 30% of the total chip 100 area layout. BIST (Built-In Self Test) circuitry 125 exists in the IO area along the sides as shown, preferably for testing the logic in the core; it can also be modified to test memory and any other component in the Structured ASIC 100. The BIST fabric 125 is for test and global connections and is three cells wide. Within the core 115 there is additional routing to connect the logic blocks 203 and memory cells 110 as need be, operatively connected to the IO circuitry at the periphery of the core 115.

Figure 5A:
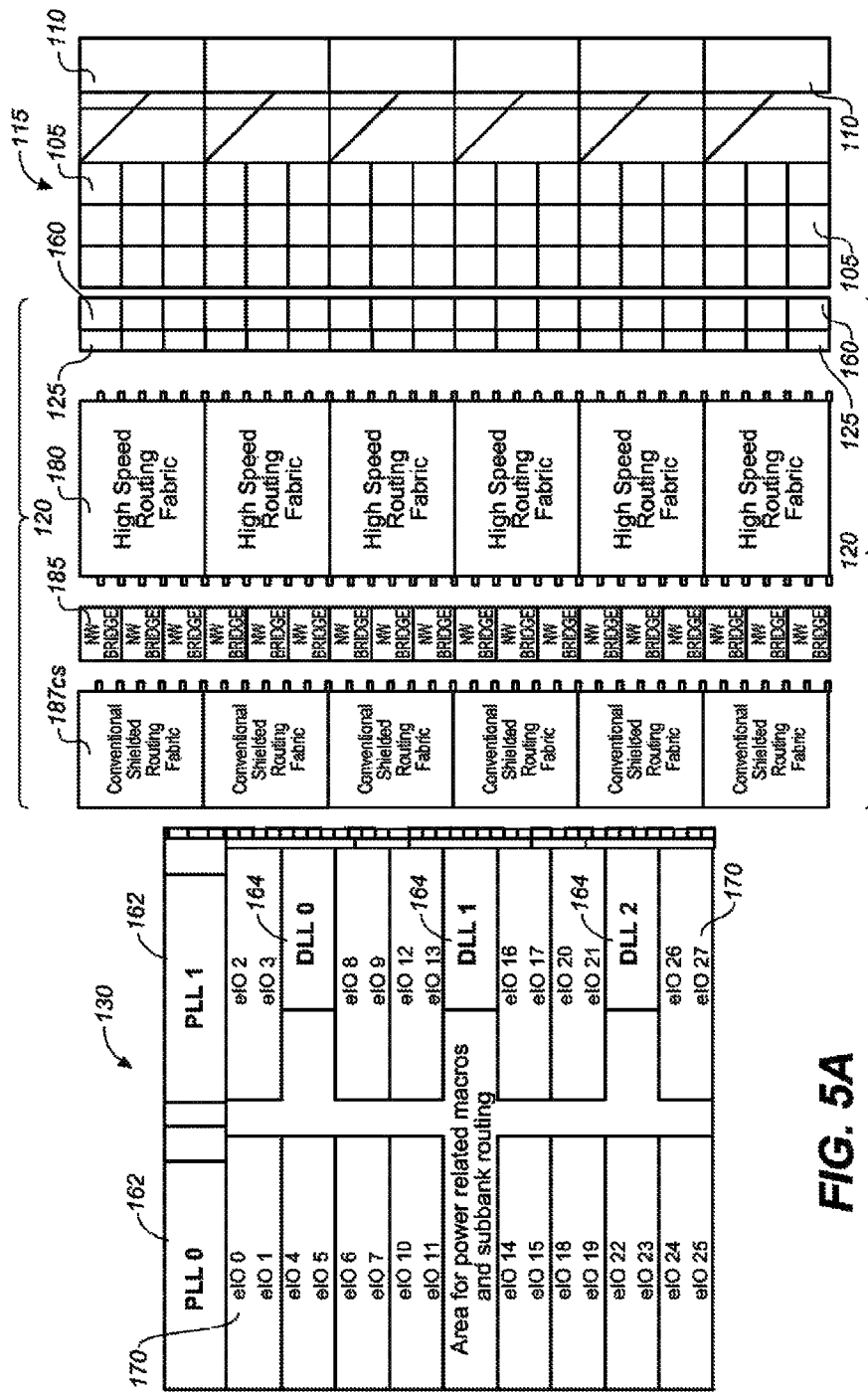
FIGS. 5A and 5B are schematics for the layout for the boundary routing IO fabric of the Structured ASIC of the present invention.
Figure 5B:
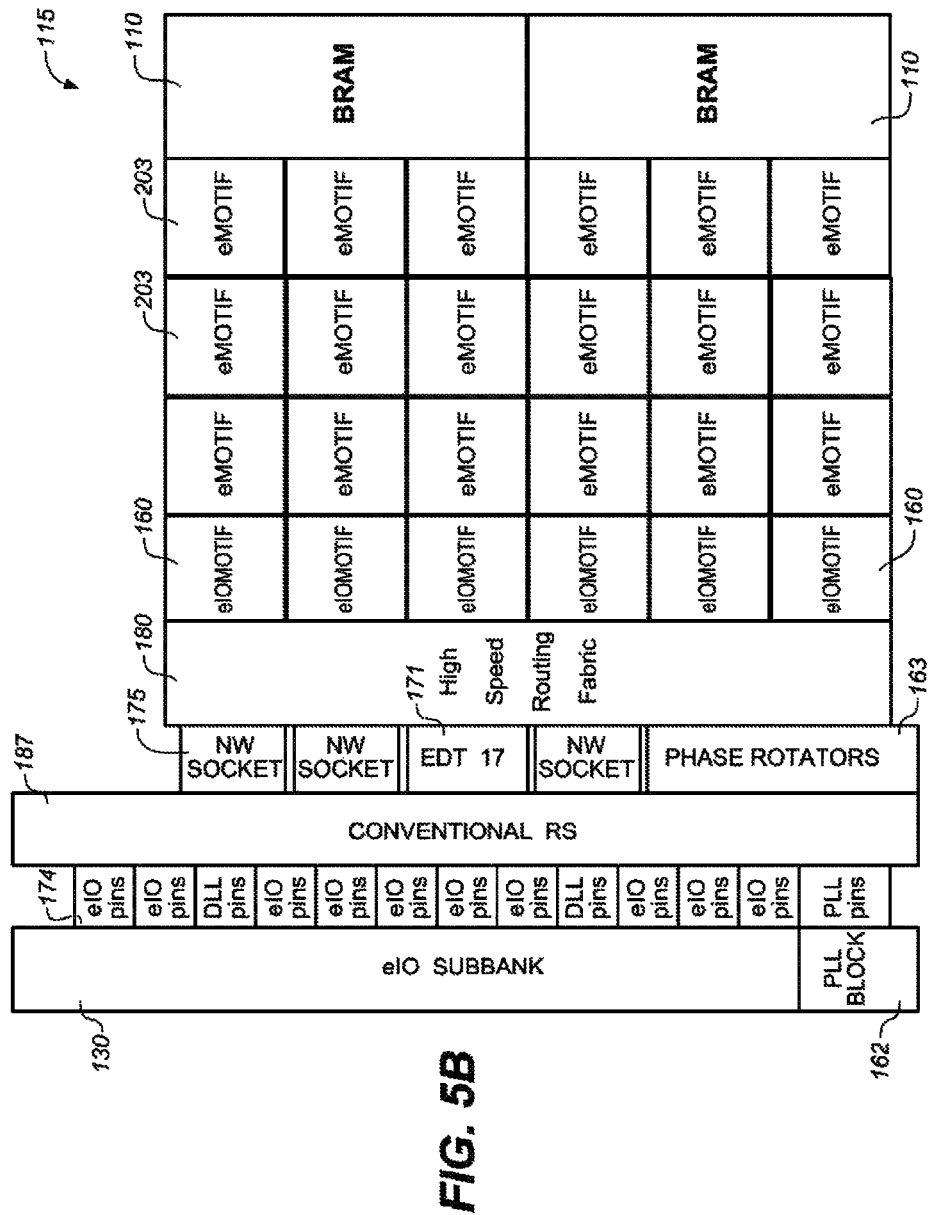
Figure 6:
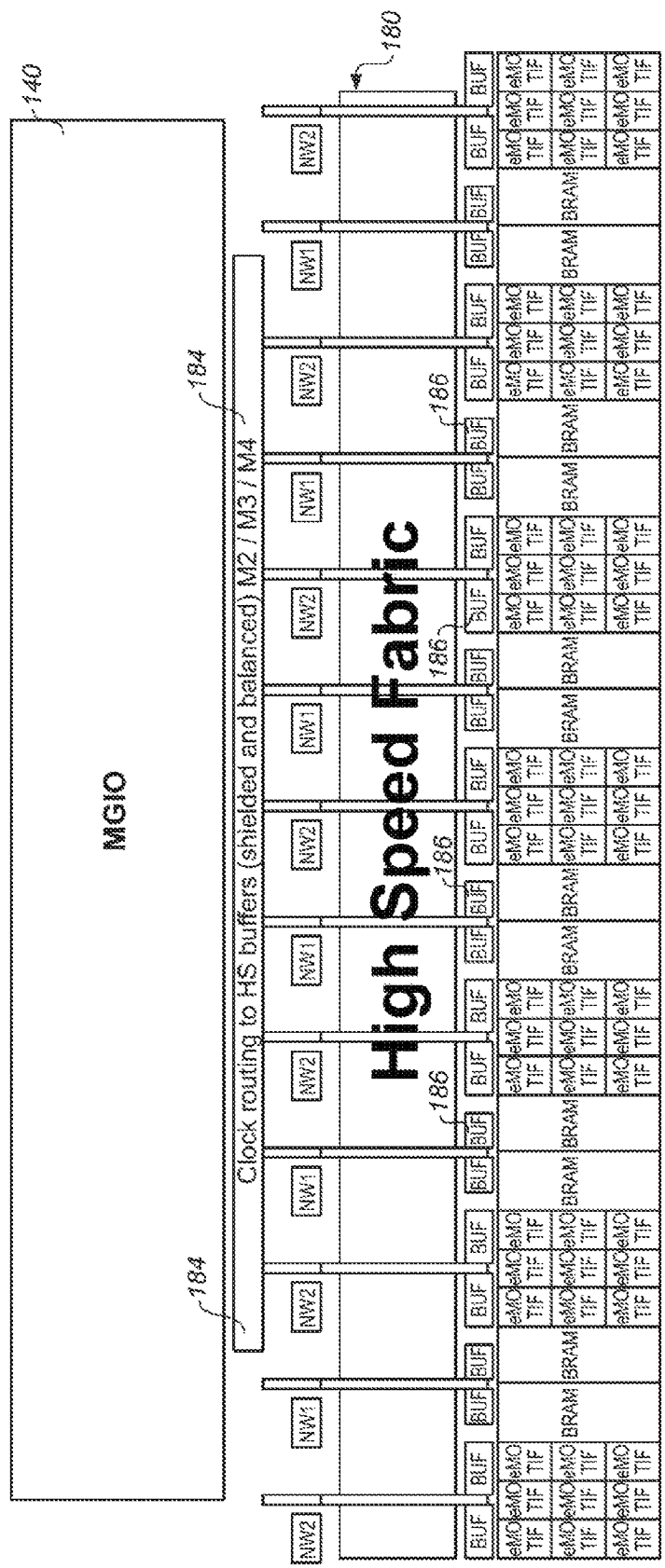
FIG. 6 is a schematic of the high-speed routing fabric of the present invention.

As shown in the figures, in particular FIGS. 1 and 2 and FIGS. 5A, 6, the core 115, which contains logic and memory, is surrounded by IO of a first IO routing fabric, having a plurality of IO regions comprising IO sub-bank 130, which is comprised of a plurality of IO termed eIOs as explained further herein, running on the left and right sides (running north/south or vertical) of the core 115. These eIOs may be serviced by a routing fabric comprising IO cells 160 termed eIOMOTIF or eIOMotif, which contains logic to configure these eIOs, and IO sub bank 130. This first IO routing fabric of eIOMotif 160 and IO sub-bank 130 is slower than a second, high-speed IO routing fabric 180 having a faster data transfer rate, as explained further herein in connection with fabric 180 as shown in FIGS. 5A, 5B, 6, and the like, that runs east-west along the top of the chip for servicing high-speed full duplex high speed SerDes (MGIO). The first IO fabric of IO sub-bank 130 has four sub-banks 132, 134, 136, 138 on the left side of the Structured ASIC in FIG. 3 and five sub-banks 131, 133, 135, 137, 139 on the right side.

The second routing fabric 180 is used to connect high-speed IO such as full duplex high speed SerDes eASIC Multi-Gigabit IO (MGIO) block(s) 140 with the logic cells 203 of core 115 and the clock tree of the chip 100. The MGIO blocks 140 are used for high-speed data transfer as SerDes (a serializer/deserializer integrated circuit transceiver that converts parallel data to serial data and vice-versa). In a preferred embodiment four MGIO blocks 141, 142, 144, 146 contain a PLL inside (not shown), and are preferably spaced at the top and bottom of the core 115. The MGIO blocks 140 that support data rates in excess of 6.5 Gbps and up to 14 Gbps or greater. Thus the present invention has a first, IO routing fabric comprising IO sub-bank 130 (eIOs) running on the left and right sides (north-south, vertically extending along the chip 100) of the core 115 and a second, high-speed IO routing fabric 180 communicating with the MGIO SerDes, running on the top and bottom sides (i.e., east-west or horizontally), with the second, high-speed IO routing fabric having a faster data transfer rate than the data transfer rate of the first IO fabric.

Figure 3A:
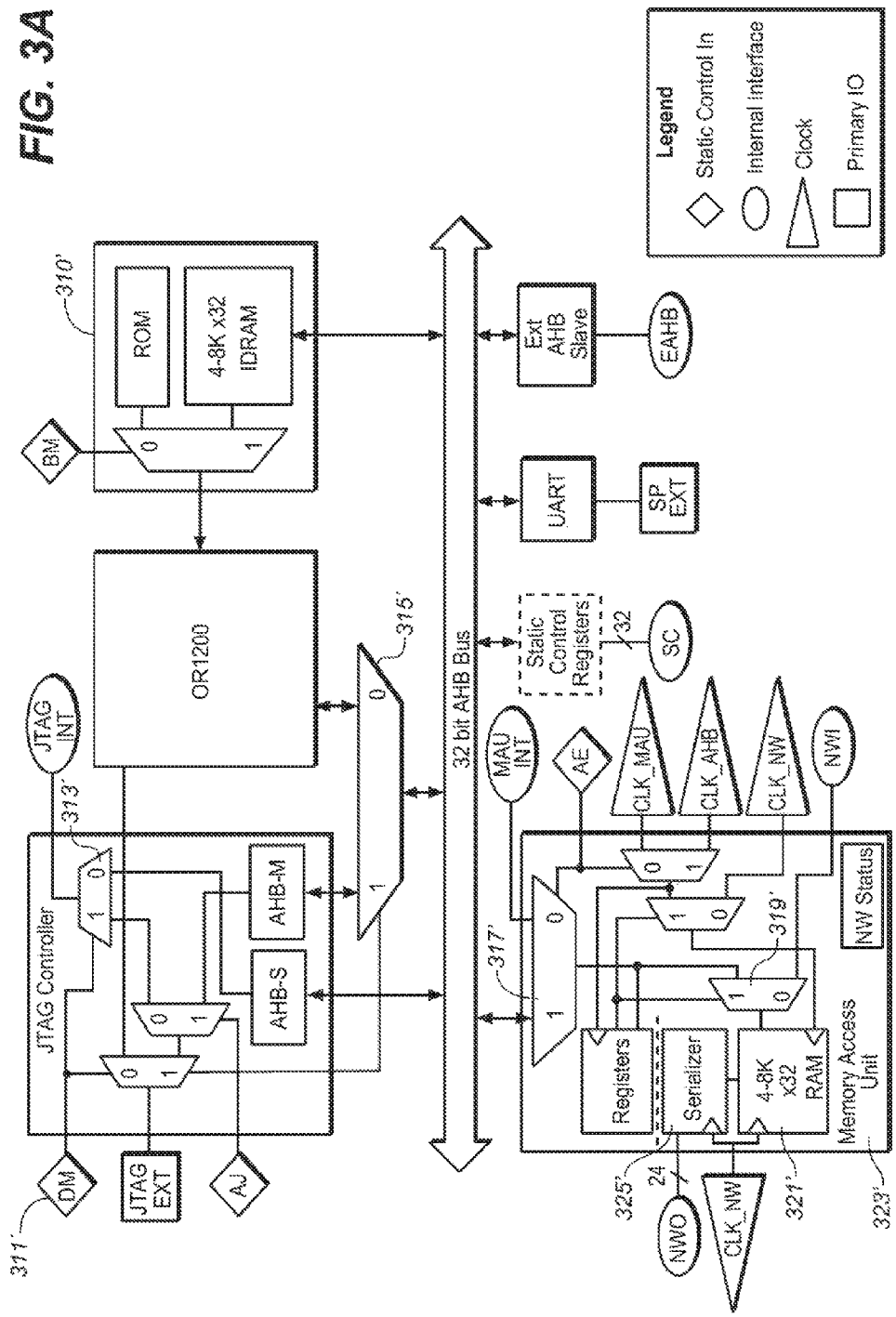
FIG. 3A is a block diagram of the microcontroller for the network-fabric of the Structured ASIC of the present invention.
Figure 3B:
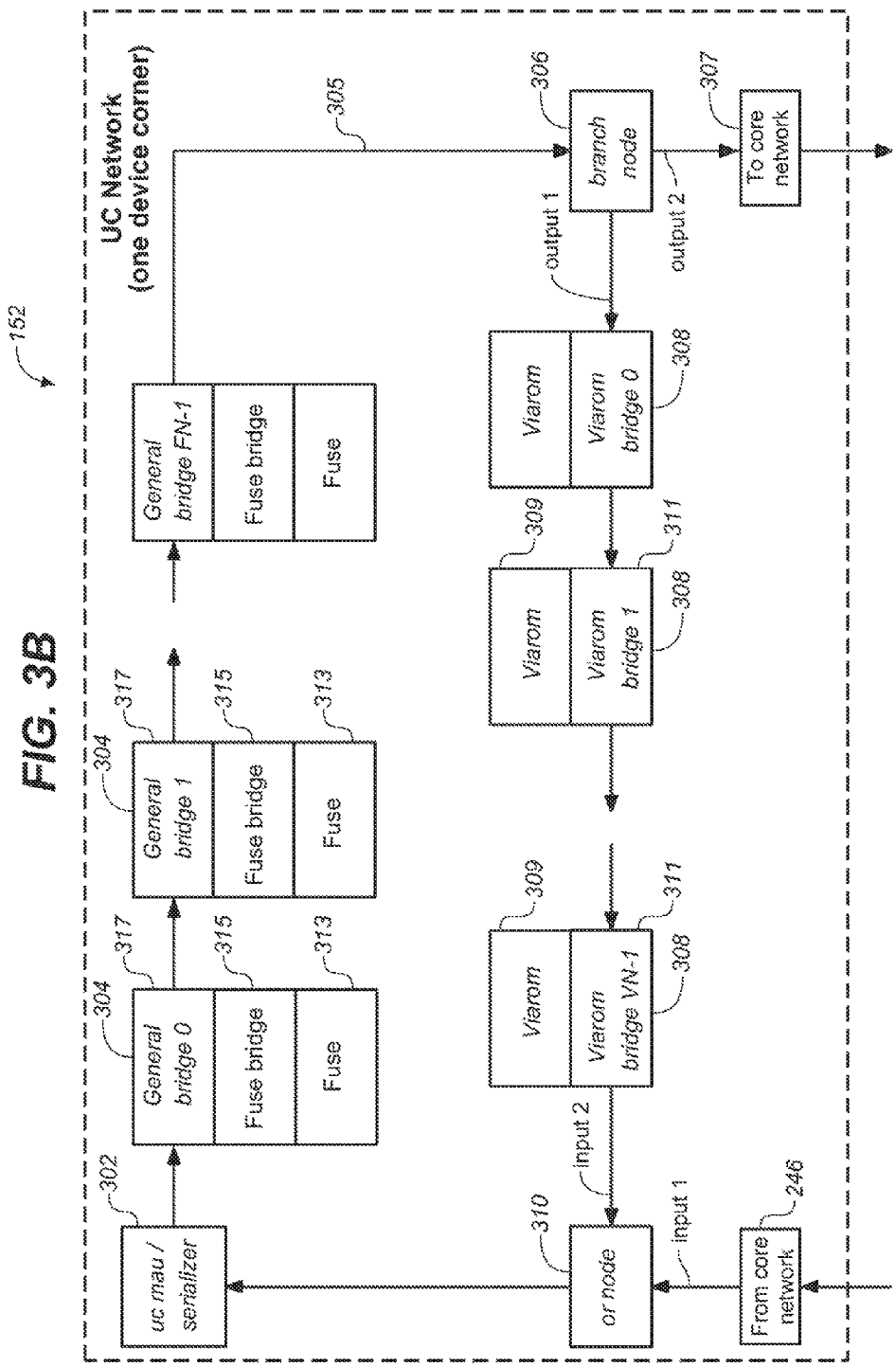
FIGS. 3B-3C is a block diagram of the microcontroller controlled network-fabric on the Structured ASIC of the present invention.
Figure 3C:
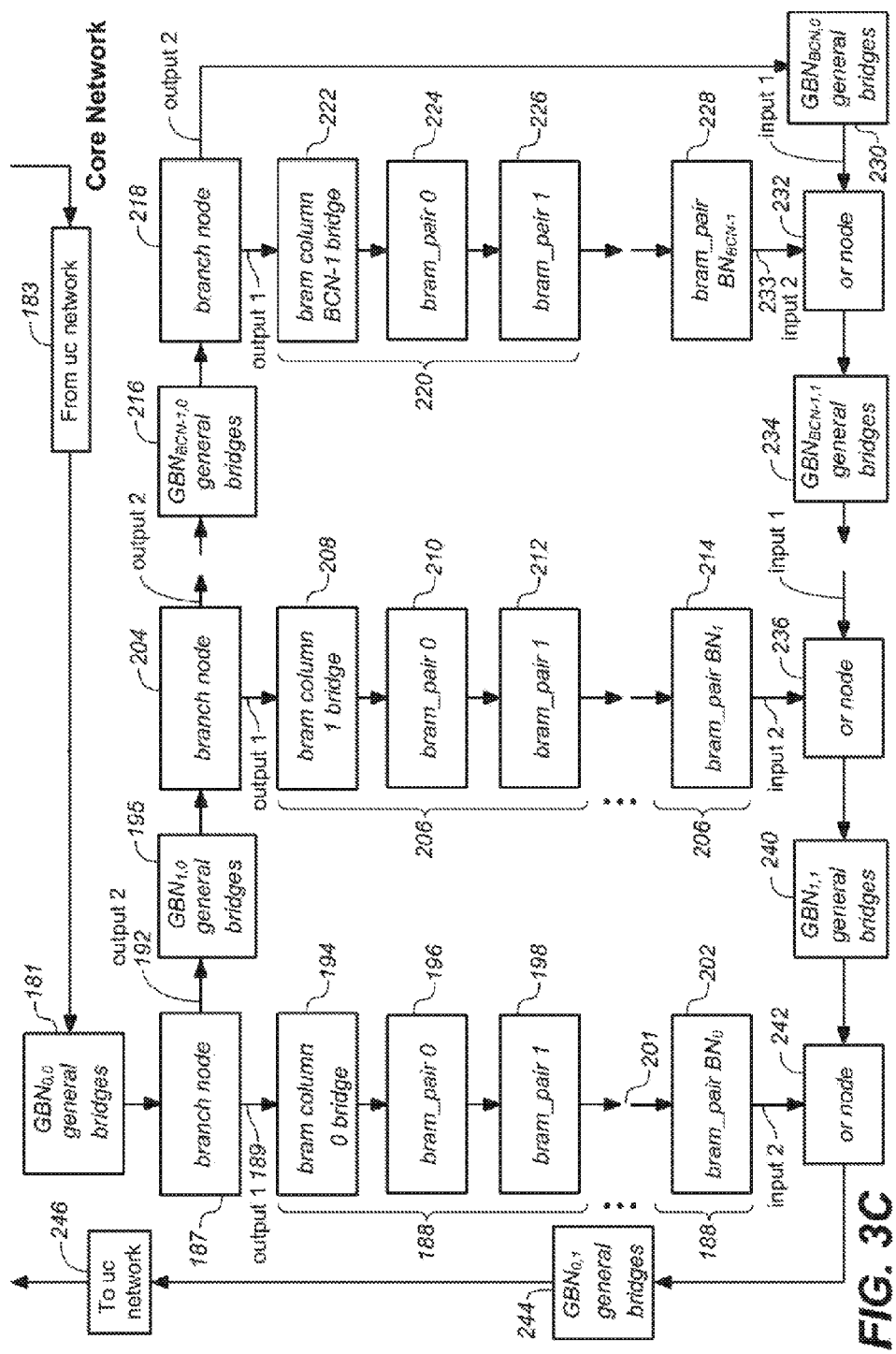

A third routing fabric comprises the network-aware IO cells, as explained further herein and as shown inter alia in FIGS. 3B, 3C, and blocks "NW1", "NW2" in FIG. 6, which can surround the chip core 115 but generally primarily on the top and bottom sides as shown, and act, together with intelligent network agents acting as bridges, to form a network fabric primarily for monitoring and testing the core 115 of chip 100 as explained further herein. The NW module can also be connected by a router circuitry to PLL, DLL or some BIST module inside of the customer logic in chip 100. They also may have embedded connections with BRAM memory blocks, ROM, eFUSE, the microcontroller of chip 100.

All of these first, second and third routing fabrics can be operatively connected to one another and to the core 115 by a Structured ASIC designer as needed according to the designers whim, though generally they are preconfigured as described herein.

As shown in FIGS. 1 and 2 in the upper left hand corner there is a corner macro 150 that contains a microcontroller or microprocessor block 152 for the Structured ASIC that acts to control, inter alia, test circuitry for memory and logic such as BIST and JTAG (boundary scan test) logic. The 32 bit microcontroller in microcontroller block 152 is used for a plurality of functions including but not limited to testing, BIST (Built-In Self Test) testing, and fuse/anti-fuse support for any logic that supports this functionality, such as eFuse block 154, as well as addressing memory, such as memory blocks/cells 110. The microcontroller of block 152 may also, on-the-fly, configure IP in core 115, through the fabric in the core 115 and/or through JTAG (e.g., IEEE 1149.1 Standard Test Access Port and Boundary-Scan Architecture) ports. The microcontroller can also set impedance dynamically and digitally in the SerDes of the present invention, as well as any dynamically configurable IO components, through access to a delay tap and perform other such customization of the Structured ASIC through access to the routing fabric, e.g., such as through network-aware IO cells termed the third routing fabric.

In FIG. 1, the eFUSE block 154 (electronic fuses that can be set to be blown electrically) can be set at the foundry that manufactures the chip 100 to store what memories of memory 110 need repair so that the processor can read the eFUSE block and use the information to repair these memories upon powering up or Power On Reset (POR) of the chip 100, which is controlled by Master POR block 157. Chip ID and production and process specific information can also be stored in the eFUSE block 154. A Master Power On Reset (POR) block 157 controls what sequence of events occurs when the Structured ASIC is power cycled on. A VIAROM block 156 (2 MB memory) records data and is via-configurable ROM, so by setting certain vias one can program the ROM with data. Block 158 may set the reference voltage for the Structured ASIC chip.

Regarding testing and repair of memory cells in the chip 100, the microcontroller of microcontroller block 152 selects which memory cells 110 are to be tested and/or repaired. This is done in a "network" fashion, with the network-aware IO cells, forming the third routing fabric as explained further herein, located between the logic blocks 105 and memory cells 110 in the core region 115, and the IO sub-banks 130, and forming a third IO network-aware connection fabric.

The network-aware connection fabric comprising IO cells are set up by the microcontroller block 152 through a series of instructions to set up signal circuit paths that act as a non-adaptive or static routing bus in a hybrid bus/pipeline manner, which establishes a signal path between the microcontroller block 152 and specific memory blocks and/or test circuitry for logic blocks in core 115. Test circuitry for logic blocks is operatively connected with the network-aware third routing fabric, which can include bridges and other intelligent network agent blocks at the top and bottom of the core 115, such as shown in "NW2" in FIG. 6, and which are configured by the microcontroller of microcontroller block 152 to assume a state as to whether the instructions and/or data (hereinafter "data" in the plural) from the microcontroller is to be passed by the blocks or not, to establish a signal circuit path in the network-aware third routing fabric between the microcontroller and the logic. After such a signal circuit path is established, data from the microcontroller circulate around the third network-aware routing fabric, with the data directed to the test circuitry in question. The same is achieved by blocks in the third routing fabric such as block "NW1" in FIG. 6, as explained further herein, to establish a signal circuit path in the network-aware third routing fabric to connect the microcontroller block 152 to a specific memory cell(s) of memory 110. Once the signal circuit path is established by the intelligent agents and bridge blocks, data continue around the network-aware third routing fabric until they reach the correct memory cell to which they is directed, e.g., as determined by the bridge blocks governing the memory, such as block "NW1" in FIG. 6.

After the memory is tested, either by external means when the Structured ASIC is manufactured, or by the microcontroller, the memory cells 110 may also be repaired by the microcontroller block 152, if the microcontroller determines the memory is defective during test, since each memory has a redundant bit for repair in case one bit on a memory cell is defective. Muxes on the memory will render operable the redundant bit to repair the defective bit if a defect is found. The microcontroller can also be run in debug mode to query each memory one at a time. Typically this testing and/or repair of memory is done by the microcontroller upon bootup, power on or start of the Structured ASIC.

Turning attention to FIG. 3A, there is shown the microcontroller for testing of the memory and logic of the Structured ASIC, termed the Ruby eController. The eController is a hard macro that can implement a factory test of eASIC devices such as the present invention. In FIG. 3A, elements from elsewhere in the disclosure may be mixed therein; hence elements from the corner macro 150 and the microprocessor block 152 may be found in FIG. 3A. A legend is shown and the usual conventions for electronic symbols and indicia apply, e.g., the number 32 with the slash at the Stack Control Registers means a 32 bit data pathway, and bidirectional arrows mean data can flow to and from two elements operatively connected.

The Ruby eController/microcontroller consists of three main parts: the microprocessor/control processor (block OR1200), the JTAG Controller block, and the Memory Access Unit (MAU) block. In addition, there are several supporting peripherals and extension ports, such as UART (Universal Asynchronous Receiver/Transmitter, a type of "asynchronous receiver/transmitter" hardware to translate data between parallel and serial forms), Control Registers, and an AHB Slave Extension Bridge. In FIG. 3A, the written indicia therein stands for the following: DM=Direct Mode, a mode of testing that does not require active intervention by the microcontroller on the chip, but may be directly connected to JTAG complaint testing machine outside the chip; BM=Boot Mode, for when the chip is booting up; AJ=AHB or JTAG Select, as explained further herein; AE=AHB Enable, to enable the AHB bus; SC=Static Control, as explained herein; INT=internal to device, i.e., on-chip; EXT=external to device IO; SP=UART serial port; MAU=Memory Access Unit; NW=internal network to the chip (e.g., such as a network aware IO routing fabric forming a third routing fabric herein); NWI/NOW=Network Bus IO which may be operatively connected to third routing fabric; AHB=AMBA (Advanced High-Speed Bus); OR1200=the OR1200 Open RISC core processor; and a 32-bit AHB Bus.

There are two main modes of operation for this subsystem shown in FIG. 3A. The "Direct Mode" and the "Processor Mode". In Direct Mode (DM=1) the OR1200 can be held in reset, and the external JTAG pins may directly control any slaves on the eController AHB bus (slaves being any chips tested that are external to chip 100) or the internal JTAG chain. Whether JTAG transactions from the primary IO are forwarded to the internal JTAG chain (internal to the device, external to the eController) or to the AHB bus is determined by the AJ static control pin (static control pins interface with the outside world if data is to be input or output). When AJ=0 the JTAG input signals are simply passed through to the JTAG output signals. When AJ=1 the JTAG signals must be translated by a customized TAP (Test Access Port) controller to AHB bus transactions. This is done by the block labeled AHB-M. The JTAG may be any form of JTAG signal including proprietary custom JTAG compatible signals.

In "Processor Mode", DM=0 and the external JTAG pins are used to control the debug port on the eController OR1200 processor. In this mode the processor is the only master on the AHB bus. The processor may directly access the internal JTAG chain through the AHB slave port on the JTAG controller. The JTAG controller as shown in FIG. 3A can receive instruction from the OR1200 processor to drive JTAG commands over the AHB bus, as well as write and read JTAG instructions on the bus. When these instructions are from an external Tester the JTAG commands would be received from the square port marked JTAG EXT in FIG. 3A.

The AHB-S block does the inverse function of the AHB-M block—it translates AHB read and writes into JTAG instructions. The JTAG instructions translated to and from the AHB-JTAG protocol may be standard JTAG or custom JTAG signals. The AHB-S bridge translation can be generic enough so as to not require knowledge of the actual instructions, but it should accommodate many possible scenarios a designer can anticipate. The processor can execute directly out of its dedicated SRAM or initially boot from an on-chip ROM and then switch over to execution to SRAM under control of the boot ROM code or a debugger. When the processor does not boot from the console (Boot ROM), the boot address of the processor is under the control of JTAG. Whether boot is from ROM or memory on startup is determined by the circuitry in FIG. 3A at the block 310' showing ROM, memory DRAM and a mux with control pins.

Any internal MAU AHB bus is available in either Direct or Processor mode. The internal MAU has the ability to statically override the internal AHB slave port on the MAU and allow a master external to the Ruby eController to access the MAU shared memory and registers. This feature is controlled by the AE bit shown in FIG. 3A. The processor should be held in reset in this mode.

The general data flow of FIG. 3A is as follows, when performing a test on the NW bus using the eController processor, such as the OR1200. A similar flow would be used in Direct Mode only the processor steps would be skipped and/or performed directly through the JTAG pins. These data flow steps are just one of many ways of implementing the eController of the present invention and are not meant to be limiting. The eController of FIG. 3A may be operatively connected to the third routing fabric such as at the output of the 24-bit Serializer 325', which is also shown in FIG. 3B as uc mac/serializer block 302, hence this block 302 can be thought of as operatively part of the microprocessor of microcontroller block 152.

First, the processor code and static data, such as from the OR1200 processor, will be loaded into the IDRAM either via JTAG or the console. The processor is enabled and writes to the remap bit of the Control/Status register if the BM pin is 1. Flow of data in FIG. 3A in this case is from elements DM 311' to mux 313' to OR1200 to mux 315' through 32-bit AHB bus to IDRAM, with BM=1 and DM=0 (Processor Mode).

Second, the processor loads the test patterns from the IDRAM to the MAU memory for the first test. The data flow path for this second step is from IDRAM at block 310', through the 32-bit AHB bus (operatively connected thereto via the double arrow connection), though the mux 317', mux 319' and to the MAU RAM 321', a 4-8 k×32 RAM.

Third, the processor such as the OR1200 programs the MAU Serializer Parameter register with the start address of the test pattern, the size of the test pattern buffer, and the fragment and repeats values. Fourth, the processor programs the Recording Buffer (RB) start address and buffer size in the RB Parameter register. Fifth, the processor sets the Serializer Start bit in the Control/Status Register. Sixth, the processor sets the NW Bus enable bit in the Control/Status Register. The data flow path for these steps three through six is the path between OR1200, mux 315', 32-bit AHB bus, mux 317', and the Registers of the Memory Access Unit 323', and for steps five and six from the Serializer 325' to the MAU RAM 321'.

Seventh, in cases when the OR1200 processor does not know the end-of-test event a priori, the processor polls the Control/Status Register for the Serializer Start and the NW Bus Enable bits to return to zero, indicating the test has completed. The NW Bus Enable bit will return to zero when the NW bus writes the end-of-test status into the 16-bit encoded NW Bus Result Code field in the Global Control/ Status register indicating the test has completed. Software can decode the Result Code to determine the nature of the test completion. Eighth, the processor reads the result from the Recording Buffer and processes results. The data flow path for steps seven and eight is the path between OR1200, mux 315', 32-bit AHB bus, mux 317', and the Registers of the Memory Access Unit 323'. In step nine, steps 2 to 8 repeat for all test patterns. The eController of the present invention will use the AMBA AHB 2.0 bus protocol.

All of these steps one through nine are merely suggestive of one general data flow of FIG. 3A when performing a test on the NW bus using the eController processor, and not meant to be limiting.

The processor in FIG. 3A is the OR1200. The OR1200 is a 32-bit scalar RISC with Harvard microarchitecture, 5-stage integer pipeline, virtual memory support (MMU) and basic DSP capabilities. In the present invention caches are 1-way direct-mapped 1 KB data cache and 1-way direct-mapped 1 KB instruction cache, each with 16-byte line size. Both caches are physically tagged. MMUs are implemented and constructed of 16-entry hash based 1-way direct-mapped data TLB and 16-entry hash based 1-way direct-mapped instruction TLB, which are the minimum cache/TLB sizes defined for the OR1200. Supplemental facilities include debug unit for real-time debugging (via JTAG), high-resolution tick timer, programmable interrupt controller and power management support.

The boot ROM in FIG. 3A is a small VIA (1K max) programmable ROM that will contain a piece of code that implements a console utility for interactive debug through a terminal. When the boot ROM is selected as the memory from which the processor initially executes (boots), controlled by the BM pin, the console is invoked. When the user exits the console, the processor will branch into code loaded into its instruction memory and remove the address aliasing that enables the boot from the ROM.

In FIG. 3A the Instruction and Data RAM (IDRAM) is the memory for code and data storage for the processor will be implemented as dual-port on-chip SRAM. One port will be used for the instruction bus and, muxed with the boot ROM, and will connect directly to the processor. The second port will act as the data port and will be accessed through the AHB bus as one of several slaves on the bus. In this way the IDRAM can also be accessed by the JTAG master in Direct Mode. This memory may be 4-8K×32 depending on the final code requirement. The memory may be divided dynamically in any way desired between code and data.

The UART (Universal Asynchronous Receiver/Transmitter) core of FIG. 3A provides serial communication capabilities, which allow communication with modem or other external devices, like a computer using a serial cable and RS232 protocol. This core is designed to be maximally compatible with the industry standard National Semiconductors 16550A device.

In FIG. 3A the Memory Access Unit (MAU) is a test memory is a 4-8K×32 dual port memory depending on final test requirement. One port is shared between the AHB bus ports and the Network Bus Write port. The AE pin statically selects either the eController AHB port or the Internal AHB port. This pin may not be changed during operation; doing so will result in undefined system behavior. Sharing of this port between the selected AHB port and the Network Bus input port will be statically arbitrated under the control of the processor and MAU logic. Specifically the processor can set a bit in the Control register to turn ownership of the memory port over to the NW bus. When the NW bus write to the memory is complete the MAU logic will detect this event and clear the same control register bit turning the ownership of the port back over to the AHB bus. For example the MAU logic could set this bit when the Recording Buffer Address (RB) writes to the last word in the buffer specified by the RB Buffer Size parameter. The processor can poll this bit in the control register to know when it can again access the memory. The second port is dedicated for the Serializer and is read only. The MAU has four asynchronous clock domains associated with each port on the MAU block, but it is assumed that no more than two will be active at a time as one port is statically shared between three of them (CLK_AHB, CLK_INT, and CLK_NW_SHIFT). Since the AHB clock is a free running clock, special care should be taken to ensure that the clock switching between the selected AHB clock and the NW bus input clock occurs cleanly and the memory control lines as well as any other relevant control logic are in an inactive state during this switch to prevent spurious writes to the memory. The fourth clock, CLK_NW, is only used for the dedicated Serializer port and associated logic.

In FIG. 3A the registers for this block for the eController including the static control bits and global control (excluding the UART only) can be implemented as part of the MAU register block to minimize the bus complexity. The MAU registers can be read and written in the AHB clock domain. There is clock domain crossing from the AHB domain to the Serializer domain for the Serializer Parameter Register and to the AHB domain for the Serializer done status bit in the Control/Status register. The MAU registers are always accessible to the AHB interface even when the NW bus has control of the memory port.

Regarding the JTAG Controller of FIG. 3A, the JTAG controller has two main sub-blocks, the AHB-M which is used in the Direct Mode. The AHB Master (AHB-M) translates the serial JTAG inputs to the AHB protocol for single 32-bit reads and writes. Essentially this block is a custom TAP (Test Access Port) controller. The JTAG Controller of FIG. 3A also has a second sub-block, the AHB Slave (AHB-S) for when an external AHB Slave is connected to the chip.

As discussed in FIG. 3A, in the present invention the memory and logic of the Structured ASIC 100, which is operatively connected to a network as taught herein, can be tested in two ways: first under the control of an external device (e.g., by way of illustration and not limitation, an Automatic Test Equipment (ATE) machine) and second, under the control of an on-board, internal processor. These two ways of testing can be termed as Direct Mode control and internal microprocessor-based Microcontroller Control; generically one can define the control agent that directs the testing as a Tester, which includes both these two ways of testing. Under the Direct Mode control by the Tester, the control of the testing of the chip 100 is external to the chip (hence "Direct Mode"). Under internal microprocessor-based Microcontroller Control by the Tester, the testing of the chip 100 is done by control that is internal to the chip (e.g., as when using the internal microprocessor, such as the OR1200 microprocessor). Hence, when using an external Tester, the external device can load commands relating to test, such as JTAG, and tests portions of memory and logic within the Structured ASIC 100 using the network-aware IO/network fabric to communicate with memory and logic, as explained herein, and the external control agent. The external control agent device can set up test circuits as taught herein in connection with FIGS. 3B and 3C herein in the same way as can the on-board, internal processor, such as found in corner macro 150. When using an internal Tester, such as found in corner macro 150, the same tests can be run over the network-aware IO and network fabric, as explained herein, under the control of an internal microprocessor, such as the OR1200 microprocessor. Whether an external device or the internal processor is used as a Tester to test the chip using the network of the present invention is up to the designer. Given the network-fabric of the present invention, it is easy to switch between testing the memory and/or logic of chip 100 in Direct Mode, or testing under the control of the microprocessor, in internal microprocessor-based Microcontroller Control, using the network-aware IO and fabric of FIGS. 3B-3C.

Thus turning attention to FIGS. 3B and 3C, there is shown more details on the network controller and the network aware connection fabric for, inter alia, testing of the Structured ASIC of the present invention when under the control of a microprocessor, in internal microprocessor-based Microcontroller Control mode (as opposed to Direct Mode, which except for the use of an external device for control is otherwise similar). A microprocessor block 152 contains within it a plurality of logic blocks, operatively connected to work with one another around a signal pathway 305 as shown, comprising a microprocessor (or processor)/ serializer block 302, a plurality of one to N−1 number (shown in the drawings as FN−1, with "FN"=Fuse Number) of General Bridge/Fuse Bridge/Fuse Blocks 304, connected in series, and a branch node block 306 that connects to the third routing fabric, with output at block 307, or, continues around the signal pathway 305 to a plurality of ViaROM/ViaROM Bridges 308 connected in series. The ViaROM/ViaROM Bridges 308 input into an OR node block 310 that takes as another input 312 data labeled "input 1" from the third routing fabric, and outputs at its output back to the microprocessor/serializer block 302, completing the circuit.

The function of the general bridge/fuse bridge/fuses 304 are to store read-only data that the microprocessor of the microcontroller block 152 can use upon power up. This might include data that was discovered during testing of the chip 100 upon manufacture of the non-customized Structured ASIC. The function of the Viarom/Viarom bridges 308 are to load data that is stored in ROM, in the portion Viarom 309, and load it into bRAM memory 110 for use by the microprocessor, using the bridge circuitry present in Viarom bridge 308, when requested by the microprocessor AU upon bootup/powerup. The information in the ROM is transferred by the microprocessor AU 302 to the bRAM memory 110, since volatile RAM memory is faster than non-volatile ROM memory such as stored in Viarom 309. Thus a user of the present invention can store ROM data in faster RAM by loading the read-only contents of Viarom 309 into bRAM memory 110. Production information associated with the chip 100 can also be stored in the ROM. ROM can be used not only for loading bRAMs with read-only content but also for storing some design-specific information (for example, which bRAMs are tied off and thus must not be tested, and which bRAMs are ON).

Likewise, data stored in fuses 313 can be transferred through fuse bridge 315 to the general bridge 304, when queried by the processor/memory access unit (mau)/Serializer block 302, for storage in the bRAM memory 110. The information stored in the fuses would include such data as what memories in memory columns 110 contain defects that are repairable, as explained further herein. In lieu of fuses, generically any other non-volatile memory may be generally employed.

In a preferred embodiment the block 302 is a microprocessor/memory access unit (mau)/Serializer block is laid out as one block of logic. The microprocessor portion of the block 302 is a conventional microprocessor such as the OR1200 (from the OpenCores organization), but in general any suitable microprocessor may be used.

OR1200 is an OpenRISC processor that is in the prior art and sponsored by the OpenCores organization. OR1200 is a 32-bit scalar RISC with Harvard micro-architecture, 5 stage integer pipeline, virtual memory support (MMU—memory management unit) and basic DSP (Digital Signal Processing) capabilities. The OR1200 specification includes a Central CPU/DSP block, IEEE 754 compliant single precision FPU, Direct mapped data cache, Direct mapped instruction cache, Data MMU based on hash-based DTLB (Dual Translation Lookaside Buffer), Instruction MMU based on hash-based ITLB (Instruction Translation Lookaside Buffer), Power management unit and power management interface, Tick timer, Debug unit and development interface, Interrupt controller and interrupt interface, and Data WISHBONE B3 compliant interfaces. WISHBONE is an OpenCores open source hardware computer bus that allows internal communication between hardware portions of an integrated circuit. An OR1200 is a Harvard memory architecture synthesizable processor core by OpenCores.org. The OR1200 design is an open source implementation of the OpenRISC 1000 RISC architecture.

The serializer portion of block 302 is a memory buffer comprising a general purpose 2-port bRAM memory (4 k×32 bits) together with streaming logic. Streaming logic to read data from the memory is preferred to simply having the microprocessor itself handle data into and out of the memory buffer, because the microprocessor used is interrupt driven, and on occasion can pause for too long a time.

The microprocessor portion of block 302 will load instructions and/or data, hereinafter data, into the memory buffer from ROM or an outside source. The data is generally in compressed form read into the buffer in compressed form. The streaming logic of block 302 decompresses/decodes the data and then reads the compressed data from the memory buffer portion of block 302 at the maximum possible rate allowed.

The data are streamed can be used to test the bRAM memory 110 of the core 115, or the PPLs/DLLs of the Structured ASIC 100, or any random logic such as logic cell modules 105. The data are sent to the core network as indicated in block 307, and as shown in FIG. 3C.

In FIG. 3C the data are routed in a network architecture that comprises network-ware IO third routing fabric that can be on all sides of the core 115 of the chip 100, but primarily is on the top and bottom. In FIG. 3C, the memory column bridge blocks 181, 195, 216 and the like, conceptually are comprised by the blocks "NW1" found at the top of the core 115 of the chip as shown in the top of FIG. 6, and control the data entering from the top (north end of chip 100) of the memory columns 110, as explained further herein, together with any associated signal lines and interconnect, comprise the network-aware IO third routing fabric. The general bridge blocks 230, 244 on the sides, together with their interconnect and associated signal lines, further comprising the network-aware IO third routing fabric and control access to the logic cells 203 of the chip 100. Further, in FIG. 6, the logic blocks that control the flow of testing and instruction data to the logic cells and correspond to the blocks labeled "NW2", together with any signal lines and interconnect, comprise the third routing fabric. The general bridge blocks at the bottom of the core 115 of the chip (e.g. "$GNB_{1,1}$ general bridges"), and their interconnect, also comprise the third routing fabric and complete the envelopment of the core 115 by the third routing fabric on all sides: top, bottom and right and left sides. These elements are part of the network aware IO third routing fabric that primarily performs transport of data (instructions and/or data, collectively 'data') for functions such as testing by BIST the PLL and DLL in the chip 100, and for accessing and/or testing the via-configurable logic unit blocks 105 in the eMotif eCELL Matrix logic cell module 203, through scan-test or any other test. The third routing fabric such as general bridges e.g., bridge 181 may also be connected by a designer to the conventional shielded routing fabric 187cs for optionally accessing the logic in the core 115.

In FIG. 3C, the data is output from the microcontroller network at output point 183 is received by a general network bridge labeled "GBN$_{0,0}$ general bridge" 181 of the third routing fabric, that routes the data signal to all downstream elements such as a branch node 187, with the node 187 capable of splitting the data signal into either or both of two output branches, a first output 189 labeled "output 1" and a second output 192 labeled "output 2".

The bridges throughout FIG. 3C are set up to pass or not pass data according to how they are configured into a predetermined configuration or instructed by the processor of block 302 prior to data being sent to the bridges. For example, for one case, in FIG. 3C if the processor 302 wants data to pass only through bRAM column bridge 194 and not to the other bRAM column bridges, such as bRAM column bridges 208, 222, the processor would instruct, through a series of instructions, to set up general bridge 181 to pass a signal, then in another instruction cycle of the processor clock instruct branch node 187 to pass a signal only to output 1 (at 189) and not to output 2 (at 192). Then, when the processor sends out data on another clock cycle and the data flows to the branch node block 187, the data would not flow to output 2 (192) but flow out of output 1 (189) to the bRAM column 0 bridge block 194. This column bridge 194 in turn has the intelligence (and could be configured by the processor in previous clock cycles to assume a certain configuration) to pass the data to the correct bRAM_pair block in the memory column 110, such as any of the blocks 196, 198 and so on, which have been indicated by the processor to be active and the destination of interest for the data. If the column bridge 194 has been told by the processor to allow data to pass to bRAM_pair blocks 196 only (and not to bRAM_pair blocks 198 or any other bRAM_pair block in the column such as bRAM_pair block 202), this information is stored in the bRAM column 0 bridge block 194, which, preferably in a shift register (not shown) in the block 194, will know to activate only memory pair bRAM_pair block 194 to accept data, and not the other memory pair blocks, from all the memory pairs blocks 194, 196, 198, 202 in bridgeable memory column 188. The other memories are not activated, and thus when data is received from the branch node 187 at output 189, this data will only go to the activated bRAM_pair 0, block 194, and not to any other memory pair block in the column 188. The bRAM_pair 0 block 194, and all the other bRAM_pair memory blocks in the memory columns, have logic by way of a bridge (shown in FIG. 3D) to know when they are activated to accept data, as well as logic to output data from memory when requested, and to set up memory in the block for test, as the case may be.

For another example in FIG. 3C, if the processor wants data to pass only to bRAM column bridge 208, it would instruct, through a series of instructions over a number of processor clock cycles, to make branch node 187 output data only to its output 2 and not output 1, then instruct general bridges block 195 to conduct, then instruct branch node 204 to output any data received only to its output 1, not output 2, and further may instruct any downstream bridges like general bridges block 216 not to pass data. In this way once the network-aware IO cells and intelligent network agent blocks of the eIOMotif network is so set up, any data would pass through branch 204 node, to its output 1, and to bRAM column 1 bridge 208. Bram column 1 bridge 208 can be instructed by the processor in previous cycles to pass data to a particular memory pair such as any memory pair in the column of memory it controls, such as bRAM_pair 0, block 210, bRAM_pair1, block 212, or bRAM_pair BN1, block 214 of bridgeable memory column 206 and the like; this information is stored in shift registers in the bRAM column bridges, such as bRAM column bridge 208, so the bridge may activate any bRAM memory pairs such as bRAM_pair 0 (block 210), bRAM_pair1 (block 212) and the like, to accept data.

In addition the branch nodes may be instructed to pass data to both output 1 and output 2 at the same time. Hence, for a third example, in FIG. 3C if the processor of the microcontroller block 152 wants data to pass to both bRAM columns controlled by bRAM column bridges 194 and 208 at the same time, the processor would, over a series of instructions sent out over a series of processor clock cycles, instruct general bridge 181 to pass a signal, then branch node 187 to pass signals to both output 1 and output 2, then general bridge 195 to conduct and pass through a signal to branch node 204, then instruct branch node 204 to pass signals only to its output 1 but not to its output 2. In this way bRAM column bridges 194 and 208 would be able to receive data from the processor at the same time but no other bRAM column blocks, such as bRAM column block bridge 222, would receive signals.

As yet another example all the bridges and branch nodes may be instructed to transmit signals to all their branches and pathways, and this would create a "flood" of data throughout the bRAM and logic connected to the network aware third routing fabric.

In this way the network aware IO third routing fabric is first set up by the processor to be configured to pass data to a plurality of memory blocks in many different variations. Logic in core 115, comprising logic modules 203 (eMotif), which lies in rows connected to a conventional shielded routing fabric 187cs, is operatively connected to network bridges as found in bridges 230, 244 and blocks "NW2" (FIG. 6), and is also addressed in the same way as memory by the processor to establish analogous paths.

The third routing fabric is operatively connected to a plurality of general bridges such as blocks 230, 244, "NW2" (operatively connected to logic cells) or 181, 195, 216, "NW1" (operatively connected to memory cells) which can be deemed intelligent network agents under processor control from microcontroller block 152 as to what state they can assume, whether to pass a data signal or not. An aspect of the present invention is to provide a type of VCLB Structured ASIC that may use a microcontroller, network-aware IO, memory, and logic blocks in a configuration where the network-aware IO has a plurality of networking blocks connected together in parallel and serial path(s) leading to and from the microcontroller and to and from the core of a Structured ASIC containing memory and logic, the blocks acting as intelligent network agents under processor control to determine what state they can assume, to form one or more signal circuit paths, and to determine whether the intelligent network agent blocks will pass a data signal or not along the signal circuit path or paths.

In general, as can be seen from the figures, the signal pathways formed from intelligent network agents comprising general bridges such as blocks 181, 195, 216 (also designated by blocks "NW1" in FIG. 6), are network agents under the control of the processor of the controller block 152, as part of the network-aware IO third routing fabric, that carry the passage of data to and from the processor and memory, such as the memory columns 110. The signal pathways formed by intelligent network agents comprising bridges such as blocks 230, 244 are intelligent network agents under the control of microcontroller block 152 that control the passage of data into test circuitry connected to logic cells, such as eMotif eCELL Matrix logic cell module 203 (the functionality of these intelligent network agents are also shared by blocks "NW2" in FIG. 6, which control data to the logic cells). Other intelligent network agents under the control of the microprocessor of the controller block 152 and comprising the third routing fabric include branch nodes 187, 204 and 218, which are directed to controlling the flow of data to memory, OR nodes 232, 236, 242, which control the return of data back to the processor, to control whether or not the data path will be open loop or closed loop, as explained herein, and general bridges 234. The branch nodes 187, 204 and 218 and the OR nodes 232, 236, 242 can be deemed communication nodes. Similar network intelligent bridges of the third routing fabric may form signal circuit pathways that test the DLLs and PLLs that are found in the first IO routing fabric comprising IO sub-bank 120 and eIOMotif 160. Each of these intelligent network agents and bridges have a unique network address that can be assigned and addressed by the microprocessor in microcontroller block 152.

General bridge 181 outputs to branch node 187, which is also an intelligent network agent under processor control, and can direct a data signal to one of two outputs, "output 1" 189 and "output 2" 192. The first output signal 189 directs any data to a memory column, such as a memory column 110 comprising a plurality of serially connected blocks such as blocks 196, 198, which contain a memory pair of bRAM inside them, along with a bridge controller logic (shown in FIG. 3D), and headed at the north (top) end of the chip by a bridge block 194 labeled "bRAM column 0 bridge", which controls the flow of data to the bRAM_pair blocks 198, 198, 202, which together in series form a bridgeable memory column 188.

The memory blocks 194, 196, 198 are in 512 kb×18 bit configurations (with an extra bit for repair), with one bit reserved extra for repairing memory, but can also be various other configurations such as 1 k×9 bits, 2 k×4 bits, 4 k×2 bits, 8 k×1 bit and the like, and in general can be any size memory. Each memory block is part of a bRAM pair, such as memory blocks 196, 198 can form a bRAM pair. A bRAM pair has 2 bRAMs, 512×18, with an extra bit. In chip 100, the memory cells are bRAM bit memory cells an range in size from 2.3 Mb to 55.7 Mb inclusive; and, the number of instances of bRAM range from 252 to 6004 instances, inclusive. The memories themselves may comprise a pair of bRAM memories themselves connected by a memory bridge (shown in FIG. 3D), which facilitates read/write/test and other such functions into the bRAM memories. The memories and data buses working with the memories support and may optionally be double data rate transfer devices, so data is transferred on both the rising and falling edges of the clock signal (e.g., double pumped, dual-pumped, and double transition memory/buses). The memory bridge for the pair of bRAM memories in the bRAM memory pairs such as blocks 196, 198, 202 contain all logic necessary to read memory, write memory, clock the memory and test the memory in the plurality of bRAM memories, including activating BIST, as is known per se.

The bRAM column bridge 194 can direct data from output 1, line 189, rather than output 2, line 192, when instructed by the microprocessor using a predefined command, if the data is intended to be received by any memory, such as memory in bRAM memory pairs 196, 198, 202 in the bridgeable memory column 188. The bridge 194 has the intelligence to assume a state to allow the data to pass through it once it is directed by the microprocessor to do so; further, the bridge 194 can be told by the processor which plurality of bRAM memory pairs 196, 198, 202 in the bridgeable memory column are to be activated to receive data (the memory pairs to be activated are kept in a shift register in the bridge 194).

Figure 3D:
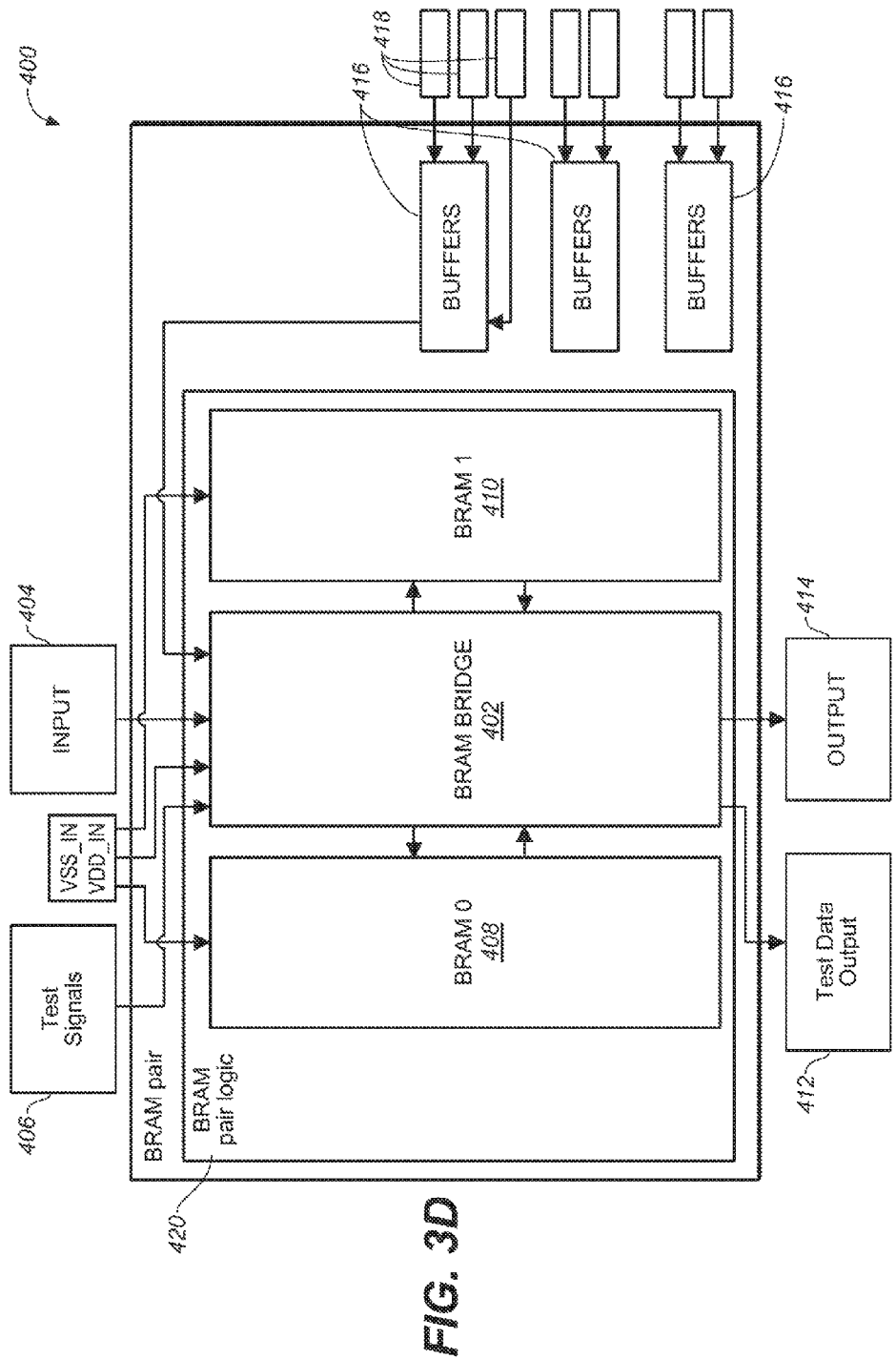
FIG. 3D is a close up view of a memory block module of the kind found in FIGS. 3B-3C.

Thus, as best shown in FIG. 3D, the top end of the memory column 110 for each bridgeable memory column such as bridgeable memory column 188 in FIG. 3C, comprises a bRAM column bridge, such as "bRAM column 0" bridge 194, controlling a plurality of bRAM pair blocks 196, 198 in series, and so on in a scalable manner until the final block 202; these blocks are labeled "bRAM_pair 0", "bRAM_pair 1" and "bRAM_pair $BN_0$", respectively. As can be seen in FIG. 3D there is a bridge 402 controlling each pair of memory blocks, blocks 408, 410, each memory blocks preferably having 18 bits (plus one extra bit for repair of defective memory) times 512. Each block 408, 410 has inside them an address decoder (not shown) as is known per se, as well as 19 bits (18 bits plus one repair bit for defective memories, as explained herein) of memory times 512 in a preferred implementation. The pair of memory blocks 408, 410 are controlled by the bridge 402 for operations such as reading the memories, writing to memories, and enabling the memories for test, as these functions are known per se in the art. Signals to activate the bRAM memory pairs 408, 410 to receive or send data may be sent by the bRAM column bridge 402. If a return signal from the bRAM memory pairs back to the microcontroller is requested, the processor of the microcontroller instructs the may OR node block 242, at the bottom of bridgeable memory column 188, to assume a state that does not block signals but allows data signals to return to the microprocessor block 152 through a path leading to the microprocessor.

Thus in FIG. 3D there is shown the inside of a bRAM_pair block 400. The bRAM_pair block 400 corresponds to a bRAM_pair, which can be termed a memory block module 400, such as blocks 196, 198, 202, 210, 212, 214, 224, 226 or 228 in FIG. 3C. The bRAM_pair block 400 has a memory block module bridge 402 labeled "bRAM_bridge" that receives input comprising one or more clock signal(s), data input, and instruction inputs as inputs 404, inputs VDD_IN, VSS_IN representing positive supply voltage and negative supply voltage (ground), respectively. In addition, there are test signals relating to ATPG (Automatic Test Pattern Generation) at inputs 406 relating to test mode for the components in the bRAM_pair block 400.

The bRAM_pair block 400 has the memory block module bridge 402 that controls a pair of memory block module memories 408, 410 which form the memory cells 110 in the memory columns of the core 115. While a pair of memory block module memories 408, 410 was used for layout purposes, with the memory block module bridge 402 in the middle for ease in signal transfer between the two memories, in the alternative a single block of memory can be used with the memory block module bridge 402, which can be any circuit that communicates with another circuit block such as bRAM column 0 bridge 194 to read to, write from and test memory.

Left block 408 labeled "bRAM 0" is one block of memory of 18 (plus one repair bit) bits wide times 512 long, in one embodiment, and right block 410 labeled "bRAM 1" is another block of memory also 18 bits wide (plus one extra repair bit). The bRAM_bridge block 402 address is stored by the bRAM column 0 block 194 and preferably is simply an index in a shift register, for simplicity, though it can be a more complicated network address. The bRAM column 0 block 194 can instruct the bRAM_bridge 402 to pass data to either the left or right blocks 408, 410 or both, and/or to put the bRAM_pair 0 block into test mode, and to read or write data stored in the memory blocks 408, 410. These commands are passed to the bRAM column 0 bridge block 194 from the processor 302 of the microcontroller block 152. Data is input in block 404 and data is output in the form of test data (clock, test results, and the like) at output 412 labeled "Test Data Output", and regular data which may include clock signal(s). Blocks 404, 406 are for test input signals (including clocks) while blocks 412, 414 are test outputs (including clocks); these are shown as split but in general blocks 404 and 406 can be combined into one input and blocks 412 and 414 can be combined into one output. These test inputs and outputs can be combined or block 404 can receive inputs from an upper bRAM bridge in the column, and block, and at output 414 labeled "Output". At the far right, at inputs 416, there are buffers for clock signals, while inputs 418 are clock inputs; these inputs are part of a functional clock tree that is not part of this invention. The memories 408, 410 and bRAM_bridge block 402 are built on a background of logic that is for repair of the memories and initialization/configuration of the blocks, and represented stylistically as "bRAM pair logic" 420. Furthermore, the memory blocks 408, 410 in memory block module 400 can have circuitry to repair the memory if the processor determines there is, after a BIST or memory test, defective memory in the blocks 408, 410. This is because there is a spare redundant bit in the memory, and in case a memory is defective, muxes and associated repair circuitry on the memory will render operable the redundant bit to repair the defective bit of memory if a defect is found. The location of defective memory may be stored in ROM for the processor to access upon bootup, such as ROM in fuses 313. Or the microcontroller of the microcontroller block 152 may determine there is a defective memory in either memories 408, 410 upon bootup or running of a memory test, and instruct the memory repair circuitry to repair the defective memory found.

Turning attention again to FIG. 3C, if the data received from microprocessor network is not intended to be directed to the bridgeable memory column 188 (since the bridges throughout FIG. 3C are set up to pass or not pass data according to how they are configured into a predetermined configuration or instructed by the microprocessor of the microcontroller block 152 prior to data being sent to the bridges), the data is passed by the branch node 187, under the direction of the microprocessor, to the next general bridge block 195 labeled "$GBN_{1,0}$ general bridge", and the process described herein of setting up a signal circuit path for data transfer by the microprocessor of the microcontroller block 152 can be repeated in other bridgeable memory columns such as bridgeable memory columns 206, 220, downstream and in parallel to bridgeable memory column 188.

Bridge and node blocks 181, 187, 194, 195, 204, 208, 216, 218, 222, 230, 232, 234, 236, 240, 242, 244 can be thought of as network agents or intelligent network agents and are intelligent enough to act as switches or routers or bridges to direct data through them or block data as the case may be, depending on whether the microcontroller block 152 is directed to the devices (e.g., memory, logic, PLL, DLL, SerDes) in a network signal circuit path controlled by the network agents or not. In addition, each bRAM memory pair, such as pair 194, has a memory bridge inside the block (not shown) that itself is an intelligent network agent and can be configured to pass data by the processor or bRAM column bridge such as bRAM column bridge 0, block 194.

The intelligent network agents are scalable in both horizontal directions (e.g. columns 188, 206, 220) and vertical directions (e.g. bRAM pairs 196, 198, 202 in memory column 188). The bRAM column bridge such as bridge 194 can ascertain what additional memory has been added to a column. The general bridges such as bridges 181, 195, 216 can determine whether or not to pass a data stream to a memory column such as memory columns 188, 206, 220. The intelligent network agents of the present invention can have a plurality of states such as a transmission state, a non-transmission state and act accordingly. This state may be triggered by a unique signal or instruction sent by the microprocessor.

The bridge 194 together with the bRAM memory pairs 196, 198 are scalable along the vertical direction forming the memory column 110, as indicated by the double arrow at line 201 indicating more memories may be added to the column such as bRAM memory pair 202. To expand the memory, one simply adds additional memory blocks serially to existing memory in a columnar form, e.g., a bRAM memory pair such as bRAM memory pair 202 labeled "bRAM_pair BN0" added to a neighboring bRAM pair on the same memory column. This is also true for the other columns shown in parallel, hence in the next column, corresponding to another column of memory cells 110, there is shown a memory column forming a bridgeable memory column 206. A general bridge 195 may direct data to this memory column 206 through a microprocessor controlled, intelligent network agent branch node block 204, which, depending on how it is configured by the microprocessor, may either output the data packet received from the microprocessor block 152, to either branch 'output 1', for output of any data to the memory column 206, or 'output 2' for the next general bridge, general bridge block 216, as shown.

The memory comprising memory cells 110 is also scalable in the horizontal east-west directions by simply adding more columns, such as indicated at column 220, together with associated general bridge such as bridge 216 and branch node 218 and bram column bridge 222.

As seen in FIG. 3C there are general bridges in the columns of memory 110, and the general bridges and the memory they service are scalable. The bRAM memory is scalable in the horizontal directions (east-west) as well as the vertical direction (north-south). In the general case a general bridge block 216, in the Nth column, will control data to be output at "output 1" to branch node block 218 which in turn outputs data onto bridge 222 of bridgeable memory column 220 having a bRAM column bridge BCN-1, block 222, which controls the data that can go to a column bridge block 222 labeled "bRAM column BCN-1 bridge" controlling access to bRAM memory blocks 224, 226, labeled "bRAM_pair 0" and "bRAM_pair1", respectively, and in the Nth case 228, N is an integer, labeled "bRAM_pair $BN_{BCN-1}$", with, as before with the bRAM blocks of memory pairs in the other memory columns 188, 206, each of these bRAM memory blocks having a bridge (not shown) controlling the read/write/test of two pairs of memory of size, preferably of size 18 bits (plus one repair bit) times 512.

Branch node block 218 has another output, "output 2" for output of data to another general bridge block 230, labeled "$GBN_{BCN,0}$ general bridges". Data from the intelligent network agent branch node 218 may be, under the direction of the microprocessor, sent to either or both of outputs output 1 or output 2.

At the bottom of the network of FIG. 3C there are circuit blocks acting as intelligent network agents for completing a loop path for a signal to travel back to the microprocessor block 152, if these blocks are set up by the processor to return data. This is because the network of the present invention as shown in FIG. 3C has two modes, an open loop mode and a closed loop mode. In the closed mode loop, the paths from the top to the bottom all return back to the processor, meaning there is a continuous signal path that follows various loops to and from the processor. In an open loop mode the paths do not return to the processor.

Numerous examples can be given of closed and open loops; thus for demonstrative purposes only a few examples will be given; the rest can be understood by one of ordinary skill in the art from the teachings herein. One such closed loop, closed loop I, in FIGS. 3A and 3B, by way of example, is the signal loop traversing the signal circuit path emanating from the microcontroller network at 183, through bridge 181, branch node 187, down bridgeable memory column 188, past input 2 from the final bRAM memory pair block 202 in the column, through the OR node 242 though general bridge block 244 and back to the microcontroller network of FIG. 3B as shown 246, and through the OR node block 310 and returning to the processor/Serializer block 302. Another closed loop, closed loop II, could be the path from general bridge block 181 to branch node 187 to general bridge 195, branch node 204, bridgeable memory column 206, OR node 236, general bridge 240, then returning through OR node 242, bridge 244, and back to back to the microcontroller network of FIG. 3B as shown 246, and through the OR node block 310 and returning to the processor/Serializer block 302. A third closed loop, closed loop III, might be the path from general bridge block 181 to branch node 187 to general bridge 195, branch node 204, output 2, general bridge 216, branch node 218, bridgeable memory column 220, input 2 at reference number 233, OR node 232, general bridge 234, and any intermediate nodes and bridges that may exist if other columns are present (not shown), OR node 236, general bridge 240, then returning through OR node 242, bridge 244, and back to back to the microcontroller network of FIG. 3B as shown 246, and through the OR node block 310 and returning to the processor/Serializer block 302. Another closed loop might be for the microcontroller to instruct all intelligent network agents of all branches to accept and pass data, so that all bridges are open to transmit data and all branch nodes transmit data to both of their outputs, e.g. to both output 1 and output 2. In this case the network-aware IO cells forming the third routing fabric becomes a traditional "flooded route" network or bus network where every signal from a processor is sent everywhere on a bus.

In all of these closed loops the processor would selectively send instructions to each intelligent network agent in the loop, such as the bridge and branch node blocks, upon each clock cycle of the processor, to activate and setup the intelligent network agents to transmit data along the predetermined paths that comprise the closed loops. The closed loops can be traversed individually, one at a time, one for each test, or traversed for a single test all at once, meaning in the above example the closed loops I, II and III are each set up (in a series of clock cycles by the controller), then all are run to complete a single test.

In all these closed loops the microcontroller can ascertain return data from blocks in the loop. By contrast, an open loop does not immediately return to the microcontroller but the data will terminate, such as by way of example the data will emanate from the microcontroller but end up stored in memory, say bRAM memory pair 198, after it is acted upon by circuits within the transmission path of the open loop. This is typical when there is a test, where after the performance of the test the data resulting from the test can be stored temporarily in the memory location itself, in an error accumulator portion of the memory, to be ascertained by the processor at a later time rather than immediately.

An example of an open loop, open loop I, is the path of the signal loop traversing the path emanating from the microcontroller network at 183, through bridge 181, branch node 187, down output 1 at reference 189 (but not output 2), down bridgeable memory column 188, to any number of bRAM memory pairs such as blocks 196, 198 or 202 (or any bRAM memory pairs that may exist in-between), but terminating at one of these memory pairs and before OR node 242 which would be instructed by the microprocessor to not conduct any signal through it. Another open loop, open loop II, which may exist alone or in combination with the previous open loop, might be the path of the signal loop traversing the path emanating from the microcontroller network at 183, through bridge 181, branch node 187 down output 2 at reference 192, through general bridge 195 and to branch node 204, down output 1 (but not output 2), down bridgeable memory column 206, to any number of bRAM memory pairs such as blocks 210, 212 or 214 (or any bRAM memory pairs in-between), but terminating at one of these memory pairs and before OR node 236 which would be instructed by the microprocessor to not conduct any signal. This open loop can be set up by the microcontroller to stand alone, or to exist in conjunction with the prior open loop, so that first one open loop then the other is run. This is true for any of the open loops: they may be run alone or one after the other. In addition, the microcontroller of the present invention can run in series one after the other a plurality of open loops and closed loops, so from the previous examples a set of loops can be set up in a series of clock cycles by the controller comprising: closed loop I, open loop II, closed loop II, open loop I, or any permutation thereof and in any path to any memory or logic block in the Structured ASIC. Tests on the processor memories and logic, such as BIST-type or scan-chain type tests, may be then run along the loop(s), and results from the tests returned by the open loops, or, in the closed loops, stored by elements (such as memory in bRAM or a flip-flop or latch or memory on a logic module that is for testing logic such as eMotif 203), until such time the processor sets up a return path for the elements storing test results and queries the elements to return test results back to the processor for analysis.

Hence, for open loops, information recorded by components of the Structured ASIC during open loops is typically stored in memory such as the memory 110 and therefore in another series of operations the microcontroller block 152 can, through microprocessor block 302, query each closed path by opening a return path to the block 152 and addressing memory locations to read any information stored. Typically such information comprises BIST and logic test results.

The advantage of having the architecture of FIG. 3C with open and closed loops is that memory columns may be tested in a flexible manner, so that some memory columns can be tested while others are not, and at various frequencies. Thus, for an open loop, a test pattern such as a BIST test pattern can be streamed from the microcontroller to all the memory columns 110, the BIST performed at the memory pairs of each memory column by BIST circuitry present at these memories, and the results stored at the memories until such time the microcontroller asks for any accumulated errors. Or, for a closed loop, a test pattern can be streamed to any one or all of the memory columns 110, and the results revealed as the data returns to the microprocessor in the return path of the closed loop.

If a memory is deemed to have a defect, the defect can be repaired. Thus any memory cells 110 may also be repaired by the microcontroller block 152, if the microcontroller determines the memory is defective during a test, because each memory row, page, segment, byte or block of memory in bRAM pair such as bRAM_pair 0 block 196 has a redundant bit for repair in case one bit on a memory cell is defective. Muxes on the memory will render operable the redundant bit to repair the defective bit if a defect is found and the muxes so instructed. The information needed to repair which memories is stored in fuses 313 of block 152 for each column of memory, such as columns 188, 206 and 220. Typically the testing of memory and recording of memory defects is done once at the manufacturing plant where the Structured ASIC is made, while the repair of memory is done every time by the microcontroller upon bootup, power on or start of the Structured ASIC.

The techniques described above in connection with FIG. 3C in the testing of memory can also be applied to the testing of random logic within the logic cell modules 203 of the core 115, as well as reading of registers in the logic cells and testing of any PLLs, DLLs found in the chip 100. Logic in core 115, comprising logic modules 203 (eMotif), which lies in rows connected to a conventional shielded routing fabric 187cs, can be operatively connected to test logic to test this core logic such as eMotif, with this test logic in turn connected to network bridges as found in bridges 230, 244, and also bridges "NW Bridge" in FIG. 5A; thus the logic of chip 100 is also addressed in the same way by the processor in block 152 through analogous signal circuit paths as in the testing of memory described herein.

Thus, as shown in FIG. 6, along the top sides of core 115 there are blocks "NW1" and "NW2", which act as intelligent network agent bridges for connecting test circuitry (not shown), such as BIST or scan-chain logic, for testing any logic such as memory 110 (using NW1), or logic modules 203 (using NW2) in core 115, to the microcontroller processor block 152. A circuit path for conveying data to and from the processor and logic would be established in a similar manner as described for memory herein; a signal circuit path would be established by the processor 302 of microcontroller block 152 through a series of instructions, for every processor clock cycle, turning on or off select intelligent network agent blocks, to establish a signal path to the test logic in question. Then the data (e.g. test vectors) can be input to any test logic, and/or the test logic can be queried or asked to return any test data results stored back to the processor. The signal circuit path can be open or closed loop. The NW Bridge modules 185 in FIG. 5A on the left and right of the core 115 have routable connections only with the Conventional Shielded fabric 187 and with eMOTIF's fabric in core 115, and go over the eIO-MOTIF column 160, and are not used in testing.

A user may use the so-called JTAG Standard Test Access Port and Boundary-Scan Architecture (IEEE 1149.1) to access random logic or logic in core 115, such as residing in eMotif logic cell modules 203. Logic may be accessed by intelligent network agents under the control of the microcontroller 152 to change functions such as IO delay in the circuit, by modifying circuitry using the network agents in the network aware IO third routing fabric or to control circuitry including other blocks of logic, for example Digital Control Delay Lines (DCDL).

The configuration of the topology of the third routing fabric of FIG. 3C can be deemed a non-adaptive or static routing bus in a hybrid bus/pipeline manner, depending on which signal circuit paths have been activated. Less generally, the network topology can be described in a preferred embodiment as shown in FIGS. 3A and 3B as follows.

The communication nodes and bridges form a pipeline structure. All bridges, such as general bridges 191, 195 and 216, have one logical input connected to the network bus forming the third routing fabric, and has one logical output port. The logical input of a "branch" node, such as branch node blocks 187, 204 and 218, must be connected to the a logical output of the previous "branch" node, or to the output of some general bridge, or to the output 183 from the microcontroller block 152. The logical input of any bridge (except a general bridge), such as bRAM column bridges 194, 208 and 222, must be connected to the logical output of some bridge, or to the logical output of the "branch" node. The logical input of any general bridge, like general bridge block 195, must be connected to the logical output of the previous general bridge, or to the logical output of a "branch" node, such as branch node 187. The logical output of any bridge (except a general bridge), such as the bridge in bRAM_pair BN0 (202), must be connected to the logical input of some bridge, or to the logical input of some "OR" node, such as "or node" 242. The logical output of general bridge must be connected to the logical input of general bridge, or to the logical input of some "OR" node, or to the logical input of some "branch" node. The logical output of any "OR" node is connected to the logical input of the next "OR" node, or to the logical input of the microcontroller (at block 246), or to the logical input of some general bridge. All "branch" nodes output, all general bridges and "OR" nodes (input) form a network path from the microcontroller output to the microcontroller input.

Throughout the present invention, there are intelligent bridges at the top of the memory columns 110 in the core 115 of the Structured ASIC 100, and data flows from these intelligent network agents down to the memory columns, but by reversing all elements herein by 180 degrees, the bridges may be placed at the bottom, and data can flow up the memory columns, without loss of generality. Thus when using "top" or "bottom" it should be understood that a chip may be rotated by 180 degrees still function the same as taught herein. Hence top and bottom are simply used to convey which end of the core the elements comprising chip 100 appear in, relative to an observer stationed at the bottom; equally one could speak of a distal and proximal end, rather than a top and bottom (or north and south), respectively, relative to an observer stationed at the bottom of the chip 100.

In the present invention there may be a nexus between high-speed routing fabric 180 and the third routing fabric forming the connection fabric for the IO for testing core 115, so that the microcontroller block 152 can also test any SerDes such as MGIO block(s) 140 using this network. Suitable network modules analogous to "NW2" such as shown in FIG. 6 can also be set up by the microcontroller block 152 to query the MGIO/SerDes or other high-speed IO device connected to the high-speed routing fabric 180, so there may be a nexus between the high-speed routing fabric 180 and the logic cells 203 in core 115. In general, if such connections do not exist in the prefabricated Structured ASIC of the present invention they may be added by a skilled designer from the teachings herein.

Figure 4:
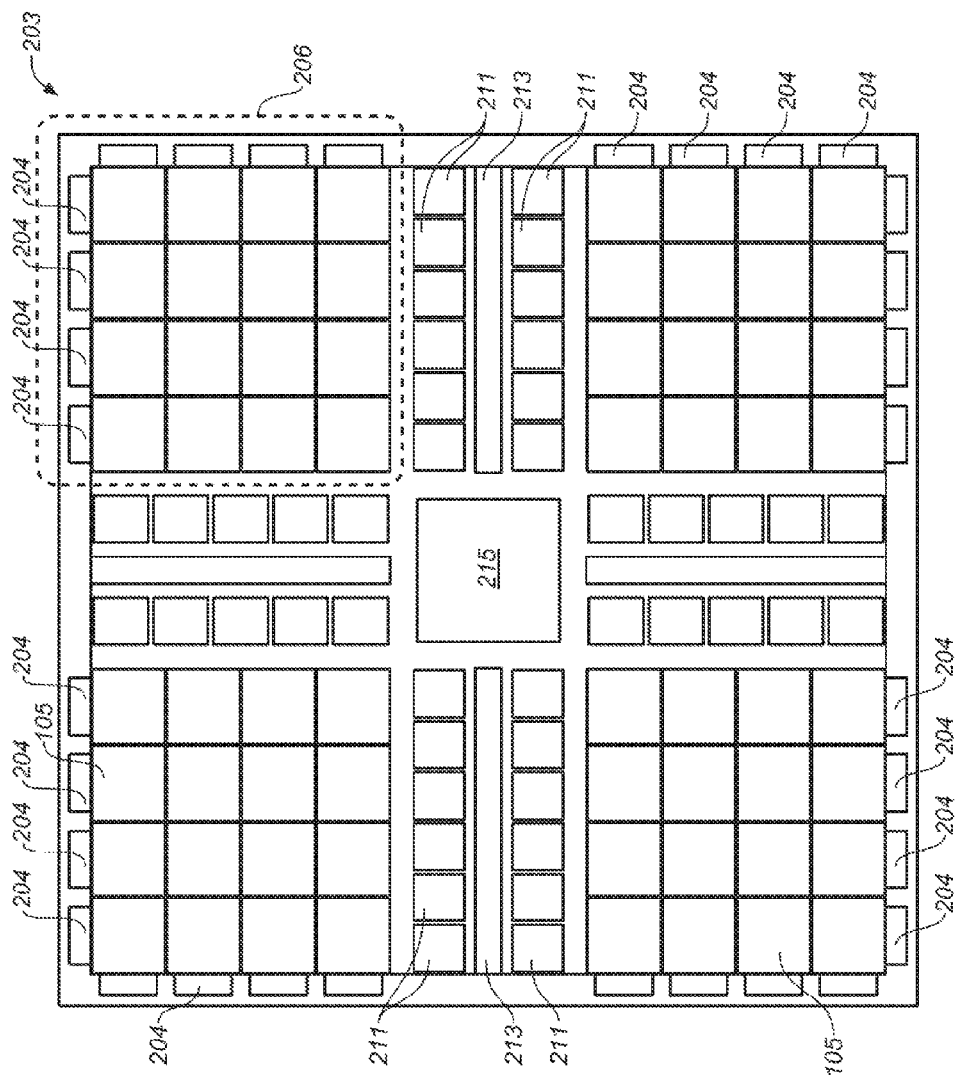
FIG. 4 is a schematic of the logic blocks used in the Structured ASIC of the present invention.

FIG. 4 is an enlarged schematic of the logic blocks floor-plan involving logic cell modules 105 in FIG. 1, termed eCELLs, with the entire array termed eMotif or eMotif eCELL Matrix 203, designated as the entire schematic shown in FIG. 4. Each eCELL logic cell 105 in eMotif eCELL Matrix 203 has customizable logic, such as Complex Programmable Logic Devices (CPLDs), using transistors that are connected to one another by vias, with the vias that are configurable by a user or customer of the Structured ASIC chip 100, and the configurable vias residing preferably in just one via layer. The Structured ASIC chip 100 of the present invention has eight signal metal layer (M1-M8, with a single via layer in-between these metal layers being customizable or via configurable by the customer of the Structured ASIC and the others being fixed prior to customization by the customer), and three metal layers M9/M10/M11 for power distribution. In one embodiment eight full adders 204 surround each four-by-four eMotif sub-block 206 of tiled pattern of logic blocks 105 (called eCELL) of the eMotif eCELL Matrix 203, as shown. In one embodiment, as shown, there are 32 full adders 204 for each eMotif eCELL Matrix 203, while in another embodiment (not shown), there are 16 full adders for each eMotif sub-block 206 giving 64 full adders. Further, there are 64 such logic blocks 105 in four sub-blocks 206 for each eMotif eCELL Matrix 203 as shown. The contents of the cell modules 105 may be any kind of logic, or configurable logic block (CLB). Furthermore these cell modules 105 may be made of FET transistors manufactured by a CMOS process in the 28 nm or smaller lithographic node.

Full adders are often used in addition and complex multiplication of the kind performed by communications ASICs and in multiplexers. The full adders 204 can be embedded inside the cell modules 105 rather than outside as shown. Conventional D flip-flops 211 are present and can be used in registers and to hold state information. An optional external routing buffer 213, that may also be incorporated into the individual logic cell modules 105 of the eMotif eCELL Matrix 203 itself, is for buffering routing paths in the eMotif eCELL Matrix 203. A clock macro 215 in the center of the eMotif eCELL Matrix 203 has routing buffers 213 for efficiently distributing one or more clock signals received from clock trees throughout the chip as well as providing a local clock signal for the eMotif eCELL Matrix 203. The buffers 213 and D-flip-flops 211 form a distinctive cross shape in the Matrix 203, centered about the clock macro 215.

FIGS. 5A and 5B are schematics of the layout for the power related macros and sub-bank floorplan routing section 130 of an IO portion of the Structured ASIC chip 100 of the present invention and routing fabric, shown in more detail than in FIG. 1. PLL/DLL blocks such as PLLs 162 and DLLs 164 and the like are shown in FIG. 5A. PLLs 162 may receive a clock signal from an outside source such as a piezoelectric crystal, and increase its frequency so it may be distributed to the rest of the Structured ASIC.

In FIG. 5A, a plurality of IO areas are reserved on the sides of the chip of the Structured ASIC for Input/Output (IO), called IO sub-bank blocks, generally block 130 forming a first routing fabric, shown as individual IO blocks 170 marked eIO 0 to 27, the entire collection of these IO blocks such as shown in FIG. 4 are eventually placed by the EDA tool in the general floorplan as shown in FIGS. 1 and 2. There are twenty-eight eIO cell blocks in the preferred embodiment shown due to package restrictions, but in general any number may be employed. The routing fabric 160, termed the eIOMOTIF boundary region, lies between the IO sub-bank 130 and core 115 of the Structured ASIC chip. Blocks 160 (eIOMOTIF boundary region) and comprises specialized logic for interface support, to connect the core 115 with IOs such as the eIO blocks 170. These eIO cells are via-programmable by a customer employing the Structured ASIC, in order to make the IO of this first routing fabric access the core 115 in such a way as to conform to various standards for accessing the contents of a Structured ASIC, and support different I/O standards requirements during user mode, as well as JTAG and test mode. For example two eIOs such as eIO0, eIO1, can form, using via-programmable techniques, two single-ended IOs or one differential IO. Some of the interface standards supported by the via-programmable eIO cells include, but are not limited to, the following interface standards, in various voltages as required by the standards: LVCMOS, PCI, PCI-X, SSTL-2 class 1, SSTL-2 class 2, SSTL-5 class 1, SSTL-5 class 2, SSTL-8 class 1, SSTL-8 class 2, SSTL-12 class 1, SSTL-12 class 2, SSTL-15 class 1, SSTL-15 class 2, SSTL-18 class 1, SSTL-18 class 2, SSTL-35 class 1, SSTL-35 class 2, HSTL12 class I, HSTL12 class II, HSTL15 class I, HSTL15 class II, HSTL18 class I, HSTL18 class II, ONFI 1.8V DDR, ONFI 3.3V SDR, LVDS, RR-LVDS, Extended LVDS, Sub-LVDS, RSDS, Mini-LVDS, Bus-LVDS, single-ended IOs, differential IOs and TMDS drivers.

IO path areas for power related macros and sub-bank routing include area 172, labeled as "Area for power related macros and subbank routing" in FIG. 5A, and the logical pin IO repeater areas 174 marked as BS-0 to 27, where any IO signal may be buffered and/or repeated or transmitted for eventual transmission to the logical physical pins that contact the Structured ASIC chip 100 at the periphery, for input/output to external signals.

For the Structured ASIC chip 100 there are several IO sub-bank routing blocks 130, as can be seen in FIG. 1, which have PLLs and DLLs as shown in FIG. 5A, and several other sub-bank blocks that do not have PLLs/DLLs. In general any number of sub-bank routing blocks and PLLs/DLLs may be used.

In IO sub-bank 130 there are two PLLs (Phase Locked Loops) 162 and three DLLs (Delay Locked Loops) 164 are also placed in this sub-bank floorplan routing. PLLs 162 have eight-phase rotators. Each PLL can produce multiple clock signals and up to eight-phases per clock signal; the eight-phase rotators are muxes that select one of these eight phases with a minimum of glitches, useful for high-speed SerDes. Design for test (DFT) areas may be present for test logic pins for use by a third party provider for testing of the chip using scan-chains, as is known per se. On the IO sub-bank 130 there may also be blocks for power clamps, POR (Power On Reset), and voltage reference related blocks.

Turning again now to FIGS. 5A and 5B there are shown first and second schematics of the boundary routing fabric in the IO region 120 for the Structured ASIC of the present invention, which includes the fabric 160, eIOMOTIF, lies between the IO sub-bank 130 core 115 of the Structured ASIC chip.

A second routing fabric comprising high speed routing fabric 180 communicates with the MGIO, high-speed SerDes, and may communicate with logic cells 203 of core 115, and the clock network of chip 100. The exact placement of the high speed routing fabric 180 vis-à-vis neighboring blocks can vary in an actual chip from the simple stylized representations as shown in the figures, since there are several layers in an ASIC chip superimposed on one another, not a single layer as shown in the drawings, without loss of generality. This is true for most of the elements in the present invention, as understood by one of ordinary skill, and that does not detract from any of the teachings of the functional relationships between the elements of the present invention as shown herein.

Next to the high-speed routing fabric 180 are a plurality of network bridge module blocks 185, each may be held by a network socket such as network sockets 175, labeled "NW Bridge" 185, as well as to the conventional shielded routing fabric 187cs. The NW Bridge modules 185 in FIG. 5A on the left and right of the core 115 have routable connections only with the Conventional Shielded fabric 187 and with eMOTIF's fabric in core 115, and go over the eIOMOTIF column 160, and not used in testing (unlike the NW1 and NW2 blocks in FIG. 6). The first routing fabric comprising eIOMOTIF blocks 160 is also not used in testing and may communicate with the IO sub-bank 130 as well as with the cells in the core 115.

The dimensions of the routing fabric across IO region 120 are about 750 microns; compared to the 3×3 eMotif logic array which is about 50 microns square. The routing fabric may reside on metal layers 6, 7 and 8 (M6/M7/M8). Memory cells 110 may be repaired by the microcontroller if the microcontroller determines the memory is defective during test, since each memory has a redundant bit for repair in case one bit on a memory cell is defective, then muxes on the memory will render operable the redundant bit to repair the defective bit. The microcontroller can also be run in debug mode to query each memory one at a time.

Conventional shielded routing fabric 187cs is for conventional routing through via-programmable connections and may connect to PLLs, DLLs and the boundary of core 115.

FIG. 6 is a more detailed schematic of the high-speed routing fabric 180 of the second routing fabric of the present invention, used to communicate with high-speed devices. The high-speed routing fabric 180 of FIG. 6 appears on the top and bottom, east-west directions of the core 115, for access to the MGIO high-speed SerDes, though in general the high speed routing fabric 180 of the second routing fabric does not have to be horizontally disposed as shown. The high-speed fabric 180 connects IO logic block modules 203 of core 115 of the Structured ASIC chip 100 with the MGIO block(s) 140 and the clock routing. The clock routing 184 is shielded or double shielded and balanced (the delay from the clock source to any destination of its branch having the same delay) to allow proper clock routing and have signal lines that are properly spaced (extended spacing) to avoid interference and allow proper synchronization. The high speed fabric 180 can be comprised of high speed intelligent network agents. Suitable clock signals can be connected to clock high-speed buffers 184 connected to a clock tree at a metal layer (such as M2/M3/M4). Thus the clock signal can be distributed along signal metal layers M2/M3 and M4. The high-speed routing fabric 180 can appear in one or more of the non-customizable metal layers like metal layers M6, M7 and M8. High speed fabric 180 further has additional buffers 186 that can buffer any signal.

Regarding manufacture of the present invention, the via-configurable Structured ASIC of the present invention may be manufactured on a 28 nm CMOS process lithographic node and having feature sizes of this dimension or less. The method of manufacturing the ASIC may be as the flow was described herein in connection with an ASIC and/or Structured ASIC in the Background of the invention. The floorplan of the Structured ASIC of the present invention is manufactured using a CMOS process using NFET/nMOS and PFET/pMOS transistors, which includes a via-configurable logic block (VCLB) architecture. VCLB configuration may be performed by changing properties of so called "configurable vias"—connections between VCLB internal nodes. The configurable vias that are used to customize the chip, and are changed by the customer that deploys the Structured ASIC, is preferably on a single via layer.

Regarding the method of making and using the present invention, it should be understood that the present invention can be formed into a plurality of design configurations, limited nearly only by the imagination of the customer who employs the Structured ASIC of the present invention. Consequently when "forming" or "establishing" a circuit or signal circuit path are discussed in the claims herein, it refers not just to an actual circuit that is designed by a customer (who may or may not elect to design such a circuit or signal circuit path), but to the architecture described herein that is capable of such a circuit. The fact that a customer may not choose to establish a certain possible claimed circuit or signal circuit path is immaterial; the fact remains that the Structured ASIC of the present invention is capable of such a configuration, given the architecture disclosed and claimed herein. The same holds for the other elements of the claimed invention; it is enough that the architecture disclosed herein is possible of constructing the claimed invention.

Regarding the dimensions and parameters of the Structured ASIC: the area of the Structured ASIC is between 4.32 mm2 and 12.34 mm2 inclusive; the number of logic cells in the Structured ASIC is between 84672 and 1774656 cells inclusive; the number of full adders is between 42336 and 887328 inclusive; the flip-flops are D flip-flops and the number of D flip-flops is between 58212 and 1220076 inclusive; the memory cells are bRAM bit memory cells an range in size from 2.3 Mb to 55.7 Mb inclusive; and, the number of instances of bRAM range from 252 to 6004 instances, inclusive.

In addition, in the present invention the network aware IO and associated routing fabric of the third routing fabric used for testing can be operatively connected to 'performance monitors', electronic circuits that test throughout the chip area parameters such as voltages, currents, temperatures and the like. This information can be stored on memory in chip 100 for evaluation either later, or in real-time.

Regarding the present invention, it is important to emphasize that the floorplan of the Structured ASIC is providing an infrastructure for a customer to use to build some sort of circuit of value to the customer, primarily through programmable vias. The number of circuits that can be built, and the various interconnections between the elements of the Structured ASIC, is a large set. Thus by definition not every conceivable variation of interconnection that is possible using the architecture of the present invention can be readily described in a single document of reasonable size, but the essential features are described in the present application, as can be appreciated by one of ordinary skill in the art.

Modifications, subtractions and/or additions can be applied by one of ordinary skill from the teachings herein without departing from the scope of the present invention. Thus the scope of the invention is limited solely by the claims.

It is intended that the scope of the present invention extends to all such modifications and/or additions and that the scope of the present invention is limited solely by the claims set forth below.

We claim:

1. A microcontroller controlled network-fabric in a Structured ASIC comprising:

a core comprising memory cells and logic cells in a Structured ASC having via-configurable interconnections;

a Tester, wherein the Tester is a microprocessor;

a network-aware IO comprising a routing fabric connected to the Tester and operatively connecting the Tester to the core, the network-aware IO set up into a static routing bus under the control of the Tester wherein the network-aware IO comprises a plurality of network agents;

the network agents arranged by the microprocessor to form at least one signal circuit path forming a network operatively connecting the microprocessor to the core;

the microprocessor controlling the state of the network agents to determine whether the agents can pass data and establish the signal circuit path from the microprocessor to the core, for purposes of testing the core;

wherein the plurality of network agents under the control of the microprocessor; and, the Structured ASIC is configured through the via-configurable interconnections in the Structured ASIC.

2. The Structured ASIC according to claim 1, wherein:
the Tester is selected from the group consisting of a microprocessor, an OpenRISC 1200 microprocessor and external tester, further comprising a JTAG Controller that reads and writes JTAG instructions and is operatively connectable to the network-aware IO routing fabric, and a Memory Access Unit (MAU).

3. The Structured ASIC according to claim 1, wherein:
the core is substantially rectilinear, and the memory cells are arranged in a plurality of columns running vertically in the core, the columns having a top and a bottom, the logic cells lying between the columns of memory cells;
each column of memory cells has at least one network agent to control the flow of data to the column; and,
the network agents arranged by the microprocessor to form a plurality of signal circuit paths.

4. The Structured ASIC according to claim 3, further comprising:
performance monitors comprising circuits that test for parameters on the Structured ASIC, the parameters selected from the group consisting of voltages, currents, and temperatures, and the performance monitor circuits operatively connected to the network-aware IO and the microprocessor.

5. The Structured ASIC according to claim 3, wherein:
the network agents comprise network agents at the top of the memory column comprising a first general bridge, a first branch node, a second general bridge, a second branch node, a first memory bridge, a second memory bridge;
the first general bridge receiving data from the microprocessor at an input and outputting data to the first branch node, the first branch node receiving the data from an input and having at least two outputs, the first memory bridge receiving data from one of the outputs of the first branch node and communicating with at least one memory cell in the memory column, the second general bridge receiving data from the other output of the first branch node at an input and outputting the data to the second branch node, the second branch node receiving the data from an input and having at least two outputs, the second memory bridge receiving data from one of the outputs of the second branch node and communicating with at least one memory cell in a second memory column of the plurality of memory columns; and,
the microprocessor establishing at least one signal circuit path with the first general bridge, the first branch node, the second general bridge, the second branch node, the first memory bridge, and the second memory bridge.

6. The Structured ASIC according to claim 5, further comprising:
each memory column is comprised of a plurality of memory block modules, each memory block module in the memory block modules comprising a memory block module bridge controlling data to and from the memory cell comprising a memory block module memory connected to the memory block module bridge;
the memory bridge communicating with the memory block module bridge when the signal circuit path is established by the microprocessor, to pass data to the memory block module memory in the memory column;
BIST logic in the memory column for testing the memory block module memory, the BIST logic collecting data;
the network agents further comprise a OR node at the bottom of the memory column, the OR node receiving data from the memory cell in the memory column and outputting the data received back to the microprocessor;
the microprocessor establishing at least one signal circuit path that includes the OR node and the signal path is a closed loop that returns to the microprocessor;
the data collected by the BIST logic from the memory block module memory is output back to the microprocessor along the signal circuit path established by the microprocessor.

7. The Structured ASIC according to claim 3, wherein:
the network agents comprise a network agent at the top of the memory column comprising a branch node and a memory bridge, the branch node receiving data from the microprocessor at an input and having at least two outputs, and the memory bridge receiving data from one of the outputs of the branch node and communicating with at least one memory cell in the memory column, the microprocessor establishing a signal circuit path with the branch node and the memory bridge.

8. The Structured ASIC according to claim 7, wherein:
each memory column is comprised of a plurality of memory block modules, each memory block module of the memory block modules comprising a memory block module bridge controlling data to and from the memory cell comprising a memory block module memory connected to the memory block module bridge;
the memory bridge communicating with the memory block module bridge when the signal circuit path is established by the microprocessor, to pass data to the memory block module memory in the memory column.

9. The Structured ASIC according to claim 8, further comprising:
BIST logic in the memory column for testing the memory block module memory, the BIST logic collecting data.

10. The Structured ASIC according to claim 9, further comprising:
repair circuitry on the memory block module memory;
the data collected by the BIST logic from the memory block module memory is output back to the microprocessor along the signal circuit path established by the microprocessor;
the microprocessor instructing the repair circuitry to repair the memory block module memory.

11. The Structured ASIC according to claim 9, further comprising:
the network agents comprise a general bridge and a OR node, the general bridge receiving data from the microprocessor and outputting data to the branch node at the top of the memory column, and the OR node receiving data from the memory cell at the bottom of the memory column and outputting the data received back to the microprocessor; the microprocessor establishing a signal circuit path with the general bridge, the branch node, the memory bridge and the OR node; and,
the data collected by the BIST logic from the memory block module memory is output back to the microprocessor along the signal circuit path established by the microprocessor.

12. The Structured ASIC according to claim 3, further comprising:
test circuitry operatively connected to the logic cells for the core;
the network agents arranged by the microprocessor to form at least one signal circuit path forming a network operatively connecting the microprocessor to the core;
the network agents comprising a general bridge, the general bridge operatively connected to the microprocessor at one end to receive data from the microprocessor, and to the test circuitry at the other end;

the microprocessor establishing the signal circuit path for data to travel from the microprocessor to the bridge and the test circuitry, and returning to the microprocessor; and, wherein the Structured ASIC logic cells in the core are tested by the test circuitry.

13. A method for testing a programmable Structured ASIC, comprising the steps of:

forming a core having memory cells and logic cells in a Structured ASC having via-configurable interconnections;

forming a microprocessor block in the core;

forming a routing fabric comprising a network-aware IO connected to the microprocessor and operatively connecting the microprocessor to the core;

forming in the routing fabric a plurality of network agents under the control of the microprocessor, the network agents set up into a static routing bus by the microprocessor;

forming at least one signal circuit path in the routing fabric operatively connecting the microprocessor to the core;

controlling the state of the network agents using the microprocessor to determine whether the agents can pass data and establish the signal circuit path from the microprocessor to the core, for purposes of testing the core repairing the memory in the core, the memory having muxes that renders operable a redundant bit in the memory for repairing the memory; and, performing the testing and repair of the memory in the core during bootup of the Structured ASIC; and, wherein the Structured ASIC is configured through the via-configurable interconnections.

14. The method according to claim 13 comprising the steps of:

forming the core logic cells into a modular array having a plurality of logic cells, forming the core substantially rectilinear, forming the memory cells arranged in a plurality of columns running vertically in the core, the columns having a top and a bottom, the logic cells lying between the columns of memory cells, wherein, each column of memory cells has at least one network agent at the top of the column to control the flow of data to the column; and, the network agents arranged by the microprocessor to form a plurality of signal circuit paths;

arranging the memory cells into a plurality of columns running vertically in the core, the columns having a top and a bottom, the logic cells lying between the columns of memory cells, wherein, each column of memory cells has at least one network agent at the top of the column to control the flow of data to the column; and, wherein the network agents arranged by the microprocessor to form a plurality of signal circuit paths.

15. The method according to claim 14, comprising the steps of:

forming the core logic cells into a modular array having a plurality of logic cells the network agents comprise network agents at the top of the memory column comprising a first general bridge, a first branch node, a second general bridge, a second branch node, a first memory bridge, a second memory bridge; wherein, the first general bridge receiving data from the microprocessor at an input and outputting data to the first branch node, the first branch node receiving the data from an input and having at least two outputs, the first memory bridge receiving data from one of the outputs of the first branch node and communicating with at least one memory cell in the memory column, the second general bridge receiving data from the other output of the first branch node at an input and outputting the data to the second branch node, the second branch node receiving the data from an input and having at least two outputs, the second memory bridge receiving data from one of the outputs of the second branch node and communicating with at least one memory cell in a second memory column of the plurality of memory columns; and, establishing at least one signal path by the microprocessor instructing the first general bridge, the first branch node, the second general bridge, the second branch node, the first memory bridge, and the second memory bridge.

16. The method according to claim 15, comprising the steps of:

forming each memory column into a plurality of memory block modules, each memory block modules comprising a memory block module bridge controlling data to and from the memory cell comprising a memory block module memory connected to the memory block module bridge; wherein, the memory bridge communicating with the memory block module bridge when the signal circuit path is established by the microprocessor, to pass data to the memory block module memory in the memory column; and, forming BIST logic in the memory column for testing the memory block module memory, the BIST logic collecting data.

17. The method according to claim 16, comprising the steps of:

forming the core logic cells into a modular array having a plurality of logic cells, the network agents further comprise a OR node at the bottom of the memory column, the OR node receiving data from the memory cell in the memory column and outputting the data received back to the microprocessor;

establishing with the microprocessor establishing at least one signal circuit path that includes the OR node and the signal path is a closed loop that returns to the microprocessor;

the data collected by the BIST logic from the memory block module memory is output back to the microprocessor along the signal circuit path established by the microprocessor.

18. The method according to claim 13 comprising the steps of:

forming the core logic cells into a modular array having a plurality of logic cells test circuitry operatively connected to the logic cells for the core;

the network agents arranged by the microprocessor to form at least one signal circuit path forming a network operatively connecting the microprocessor to the core;

the network agents comprising a general bridge, the general bridge operatively connected to the microprocessor at one end to receive data from the microprocessor, and to the test circuitry at the other end;

the microprocessor establishing the signal circuit path for data to travel from the microprocessor to the bridge and the test circuitry, and returning to the microprocessor; and, wherein the Structured ASIC logic cells in the core are tested by the test circuitry;

forming the core logic cells into a modular array having a plurality of logic cells, forming the core substantially rectilinear, forming the memory cells arranged in a plurality of columns running vertically in the core, the columns having a top and a bottom, the logic cells lying between the columns of memory cells, wherein, each column of memory cells has at least one network agent at the top of the column to control the flow of data to the column; and, the network agents arranged by the microprocessor to form a plurality of signal circuit paths;

arranging the memory cells into a plurality of columns running vertically in the core, the columns having a top and a bottom, the logic cells lying between the columns of memory cells, wherein, each column of memory cells has at least one network agent at the top of the column to control the flow of data to the column; and, wherein the network agents arranged by the microprocessor to form a plurality of signal circuit paths.

19. The method according to claim 14, further comprising the steps of:

repairing the memory in the core, the memory having muxes that renders operable a redundant bit in the memory for repairing the memory; and, performing the testing and repair of the memory in the core during bootup of the Structured ASIC.

* * * * *